United States Patent [19]

Takahara

[11] Patent Number: 5,453,857
[45] Date of Patent: Sep. 26, 1995

[54] LIQUID CRYSTAL DISPLAY WITH TWO TRANSISTORS PER PIXEL DRIVEN AT OPPOSITE POLARITIES

[75] Inventor: Hiroshi Takahara, Neyagawa, Japan

[73] Assignee: Matsushita Electric Industrial Co., Ltd., Osaka, Japan

[21] Appl. No.: 92,359

[22] Filed: Jul. 15, 1993

[30] Foreign Application Priority Data

Mar. 22, 1993 [JP] Japan ................................ 5-061630

[51] Int. Cl.⁶ ............................................. G02F 1/1343
[52] U.S. Cl. ................................. 359/57; 359/59
[58] Field of Search ........................ 359/57, 59, 73, 359/40, 41

[56] References Cited

U.S. PATENT DOCUMENTS

| | | | |
|---|---|---|---|
| 4,850,685 | 7/1989 | Kamakura et al. | 350/397 |
| 4,889,412 | 12/1989 | Clerc et al. | 350/347 E |
| 4,995,702 | 2/1991 | Aruga | 359/40 |
| 5,003,356 | 3/1991 | Wakai et al. | 357/4 |
| 5,028,122 | 7/1991 | Hamada et al. | 350/333 |
| 5,048,949 | 9/1991 | Sato et al. | 359/40 |
| 5,092,664 | 3/1992 | Miyatake et al. | 359/41 |
| 5,119,220 | 7/1992 | Narita et al. | 359/73 |
| 5,157,523 | 10/1992 | Yamagishi et al. | 359/41 |
| 5,253,091 | 10/1993 | Kimura et al. | 359/55 |

FOREIGN PATENT DOCUMENTS

| | | | |
|---|---|---|---|
| 61-275822 | 12/1986 | Japan | 359/57 |
| 4264529 | 9/1992 | Japan | 359/59 |
| 5100226 | 4/1993 | Japan . | |

*Primary Examiner*—Anita Pellman Gross
*Assistant Examiner*—Charles Miller
*Attorney, Agent, or Firm*—Ratner & Prestia

[57] ABSTRACT

An active matrix liquid crystal display device in which pixel electrodes are formed in overlapping relation with source signal lines through an insulating thin-film. One of the source signal lines positioned on a left side of the pixel electrode is referred to as a first source signal while that on a right side of the pixel electrode is referred to as a second source signal. When a thin-film transistor is switched off, a parasitic capacitance between the first source signal and the pixel electrode and that between the second source signal and the pixel electrode are equal to each other. The first and second source signal lines apply respective signals of opposite polarities. The pixel electrode is formed of ITO and is not formed over the thin-film transistor. Orientation is carried out along the signal lines. With the liquid crystal display device used as a light valve, a projection display system capable of providing a projected image of high image quality at a high luminance can be realized. In such case, a phase difference plate of 5 to 50 nm is disposed between the liquid crystal display device and a polarizing plate to accomplish a phase compensation.

4 Claims, 15 Drawing Sheets

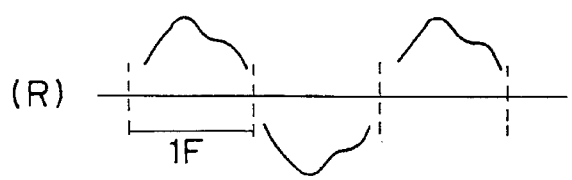
Fig.8(a) (R)
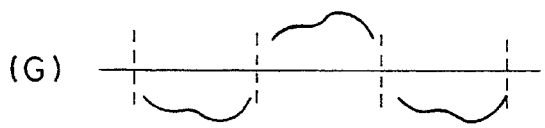
Fig.8(b) (G)
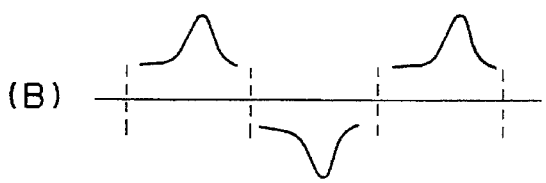
Fig.8(c) (B)
Fig.9(a)
| + | − | + | − | + | − | − | − | − | − |
|---|---|---|---|---|---|---|---|---|---|
| + | − | + | − | + |   |   |   |   |   |
| + | − | + | − | + |   |   |   |   |   |
| + | − | + | − | + |   |   |   |   |   |
| + | − | + | − | + |   |   |   |   |   |
| + | − | + | − | + | − | − | − | − | − |
Fig.9(b)
| − | + | − | + | − | − | − | − | − | − |
|---|---|---|---|---|---|---|---|---|---|
| − | + | − | + | − |   |   |   |   |   |
| − | + | − | + | − |   |   |   |   |   |
| − | + | − | + | − |   |   |   |   |   |
| − | + | − | + | − |   |   |   |   |   |
| − | + | − | + | − | − | − | − | − | − |

LIQUID CRYSTAL DISPLAY WITH TWO TRANSISTORS PER PIXEL DRIVEN AT OPPOSITE POLARITIES

BACKGROUND OF THE INVENTION

1. Field of the Invention

The present invention relates to a projection display system for projecting an image, displayed on a miniature liquid crystal panel, onto a screen and a liquid crystal display device used in the projection display system.

2. Description of the Prior Art

A liquid crystal display device in general has light-weight and thin-structured features and, therefore, researches and development have largely been made on the liquid crystal display device. On the other hand, the liquid crystal display device having a relatively large image display area is generally difficult to manufacture. In view of this, a projection display system has aroused interests in the art. The protection display system is a product of compromise that provides a viewable picture on an enlarged scale by protecting a relatively small-sized image reproduced on a miniature display area of the liquid crystal display panel.

This type of projection display system currently available in the market employs a twisted nematic liquid crystal display device (hereinafter referred to as a TN LCD device) utilizing an optical rotation of liquid crystal material. This TN LCD device modulates light passing therethrough by varying the orientation of the liquid crystal material when a voltage is applied selectively to pixel electrodes. Polarizing plates are disposed respectively on front and rear sides of the TN LCD device with respect to the direction of travel of light towards the TN LCD device, having their polarizing axes laid perpendicular to each other. The polarizing plate on the front side of the TN LCD device (hereinafter referred to as a polarizer) has its polarizing axis laid either parallel or perpendicular to the axis of orientation of one of the substrates of the TN LCD device through which rays of light enter the TN LCD device. An orientation process is carried out at an angle of 45 degrees relative to signal lines formed in the TN LCD device. In general, the TN LCD device is operated under a mode (NW mode) in which a black display is effected when a voltage is applied.

The liquid crystal panel operating under the NW mode has a problem in that light tends to leak from the perimeter of each pixel. This problem occurs because the liquid crystal molecules are oriented both in a normal direction, in which they ought to be oriented, and a direction counter to the normal direction. This type of orientation is referred to as a reverse-tilt domain. This domain is produced when the direction in which the liquid crystal molecules set up by an electric field developed between the pixel electrodes and the signal lines is partially reverse. A portion of the liquid crystal molecules set up in a reversed direction pass through the polarizing plate (hereinafter referred to as an analyzer) disposed on the rear or exit side of the liquid crystal display panel regardless of the application of the voltage. In other words, light leak takes place. No light leak occur if they are oriented in the regular direction.

To eliminate this problem, an attempt has been made to remove some of the pixel electrodes which are located at a site where light leak occurs. However, this attempt is problematic in that, if some of the pixel electrodes are removed, the surface area at which light modulation takes place will be reduced accompanied by a reduction in amount of light transmitted through the liquid crystal panel and, in turn, by a reduction in brightness of the image displayed.

Another attempt is suggested to employ a light shielding layer (hereinafter referred to as a black matrix) of an increased width formed on a counterelectrode. It is, however, found that this alternative attempt has a problem similar to that discussed in connection with the first mentioned attempt.

On the other hand, the conventionally utilized projection display systems in which the TN LCD device is utilized as a light valve fall into two categories: a front model in which a projector and a screen are separate from each other, and a rear model in which, while a transmissive screen is fitted over the entirety of a cabinet, all optical elements are accommodated within the cabinet. Both models have aroused interests in the art since they can be made compact in size.

In these projection display systems, the higher the higher display contrast, the higher the image quality. However, so long as the light leak occurs, there is no way to increase the display contrast.

SUMMARY OF THE INVENTION

A liquid crystal display device designed according to the present invention is such that pixel electrodes are overlapped on signal lines so that an electric field developed from the signal lines can be shielded by the pixel electrodes thereby to reduce generation of the reverse-tilt domain. Reduction of the reverse-tilt domain being generated brings about an advantage in that the aperture size of each pixel can be increased. Also, a suppression of the light leak from occurring results in an increase in display contrast.

For this purpose, the liquid crystal display device according to the present invention comprises:

a first substrate (hereinafter referred to as an array substrate) including a plurality of switching elements such as, for example, thin-film transistors or diodes, transparent pixel electrodes connected with one terminal of the switching elements, first and second signal lines formed in neighboring relationship with each other, and third signal lines formed for transmitting a signal necessary to selectively switch the associated switching element on and off;

a second substrate (hereinafter referred to as a counter-substrate) having a counter electrode formed thereon; and a drive circuit for applying to the second signal lines a signal of a polarity opposite to that of a signal applied to the first signal lines.

The array substrate and the counter-substrate are so processed and so treated that the respective directions of orientation thereof are perpendicular to each other. Preferably, the orientation is effected in a direction parallel to the first or third signal lines on the array substrate. Also, TN liquid crystal material is sandwiched between the array substrate and the counter-substrate while the direction of orientation of one of the substrates is perpendicular to that of the other of the substrates, and therefore, the twisting angle represents about 90 degrees.

An insulating thin-film is formed over the first and second signal lines so that the pixel electrodes overlap the first and second signal lines through the insulating thin-film. Preferably, a parasitic capacitance between each pixel electrode and the corresponding first signal line is substantially equal to that between the pixel electrode and the second signal line. If the parasitic capacitances discussed above are equal to each other, application of the signals of opposite polarities to the first and second signal lines results in a minimization of a change in potential of the pixel electrodes thereby to accomplish a stabilized image display. It is to be noted that the first and second signal lines referred to above mean source signal lines through which a video signal is applied to the thin-film transistors and that the third signal lines mean gate signal lines.

Thus, by overlapping the pixel electrodes over the source signal lines, it is possible to minimize the adverse effect which may be brought on the liquid crystal layer by the electric field developed from the signal lines. The pixel electrodes are also overlapped over the gate signal lines. By overlapping the pixel electrodes over the signal lines as hereinabove described, the electric field from the signal lines can be shielded thereby to suppresses the generation of the reverse-tilt domain in the liquid crystal material and also to avoid the light leak.

Also, in order to prevent the reverse-tilt domain from occurring, the orientation treatment is carried out along the gate or source signal lines. By so doing, the extent to which the electric field from the signal lines affects the liquid crystal molecules can be reduced thereby to minimize the occurrence of the reverse-tilt domain.

However, if the orientation treatment is carried out along the signal lines, that is, parallel to the signal lines, an optimum viewing direction, that is, the direction in which an image of the highest possible contrast can be viewed, lies in a direction slightly inclined relative to a direction diagonal to the normal of the image display area.

The utilization as a light valve of the liquid crystal display device in which the optimum viewing angle is inclined relative to the diagonal direction makes it difficult to manufacture the projection display system partly because the incident angle of light on the light valve must conform to the optimum viewing angle and partly because the optical design necessary to align the incident angle with the optimum viewing angle is not easy to achieve. To solve this problem, the projection display system designed according to the present invention makes use of a phase compensating film between the polarizer and the liquid crystal display device or between the analyzer and the liquid crystal display device. The use of the phase compensating film is operable to accomplish a phase compensation of the liquid crystal display device when the latter operates under a normally black mode, thereby to render the optimum viewing direction to conform to the normal to the liquid crystal display device.

Rays of light emitted by a metal halide lamp or the like are separated by a color separating optical system into light components of three primary colors, red, green and blue, which subsequently travel along respective optical paths. The liquid crystal display device constructed in accordance with the present invention is disposed on each of those optical paths. The liquid crystal display device so disposed on the respective optical path modulates the incoming light component. The modulated light components of the three primary colors emerging from the associated liquid crystal display devices are projected through corresponding projection lenses onto a screen so as to overlap with each other thereby to present a viewable picture.

Thus, the shielding by the pixel electrodes is effective to avoid the occurrence of the reverse-tilt domain and a rubbing along the signal lines is effective to avoid the occurrence of the domain. However, the rubbing in a direction along the signal lines does not result in the quality of the projected image that is symmetrical with respect to a left-to-right direction, but results in the image quality that is symmetrical in the diagonal direction. However, according to the present invention, since compensation is made by the use of the phase compensating film operable to compensate for a phase difference, it is possible to obtain the projected image of high image quality with no color displacement. Also, since the occurrence of the reverse-tilt domain is avoided, the aperture size of the pixels can be increased thereby to provide the display at a high luminance.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIGS. 8(a) to 8(c) are charts used to explain how the liquid crystal display device of the present invention is driven;

FIGS. 9(a) and 9(b) are explanatory diagram used to explain the method of driving the liquid crystal display device of the present invention;

DETAILED DESCRIPTION OF THE EMBODIMENTS

Figure 1A:
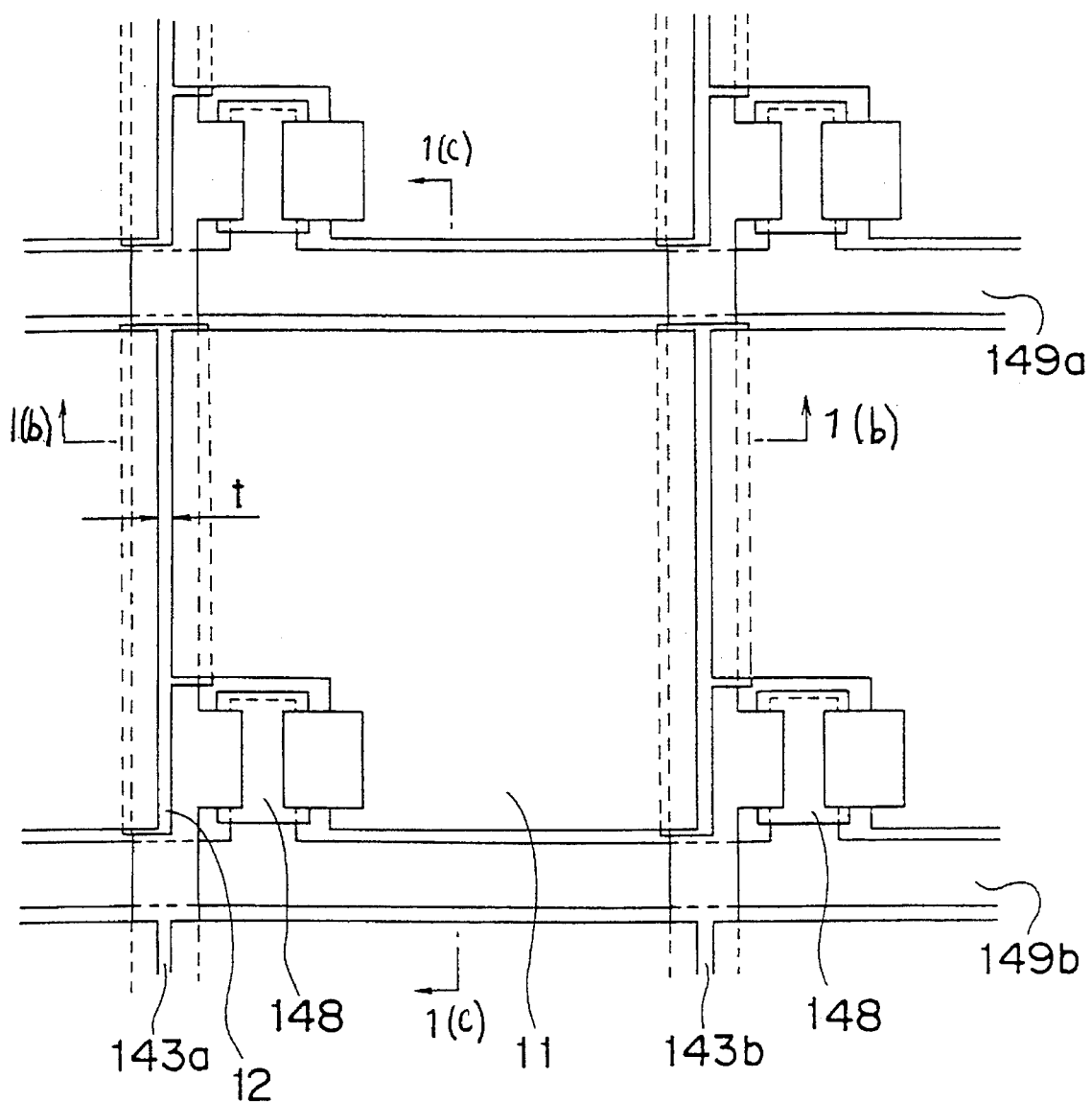
FIG. 1(a) is a plan view of a portion of a liquid crystal display device according to a first preferred embodiment of the present invention.
Figure 1B:
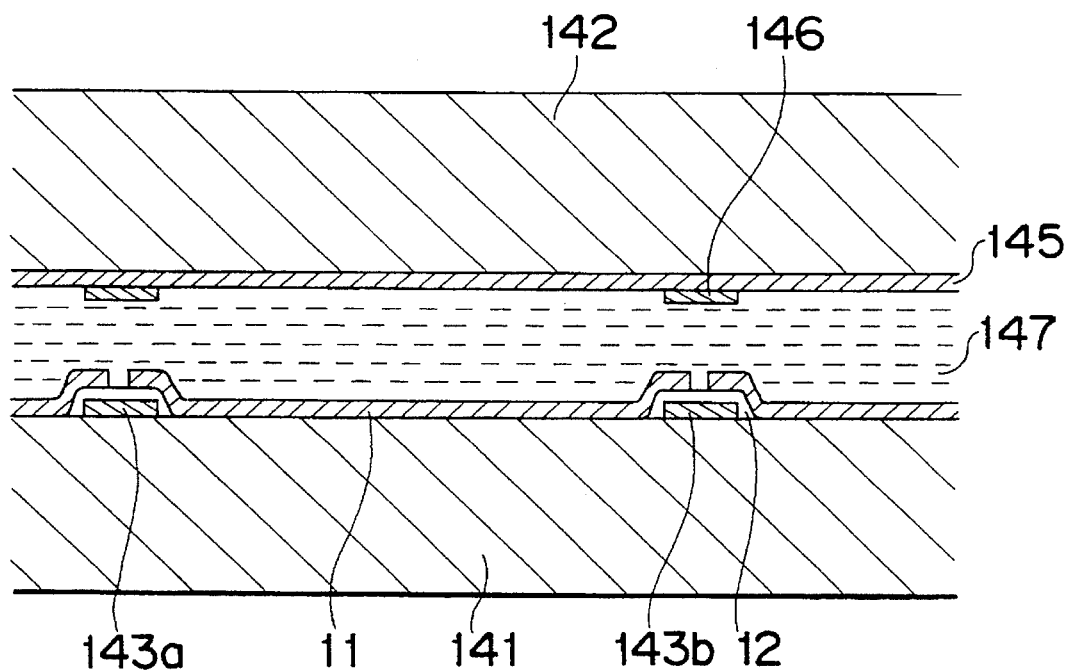
FIGS. 1(b) and 1(c) are cross-sectional views of that portion of the liquid crystal display device taken along the lines 1(b)—1(b) and 1(c)—1(c) shown in FIG. 1(a), respectively.
Figure 1C:
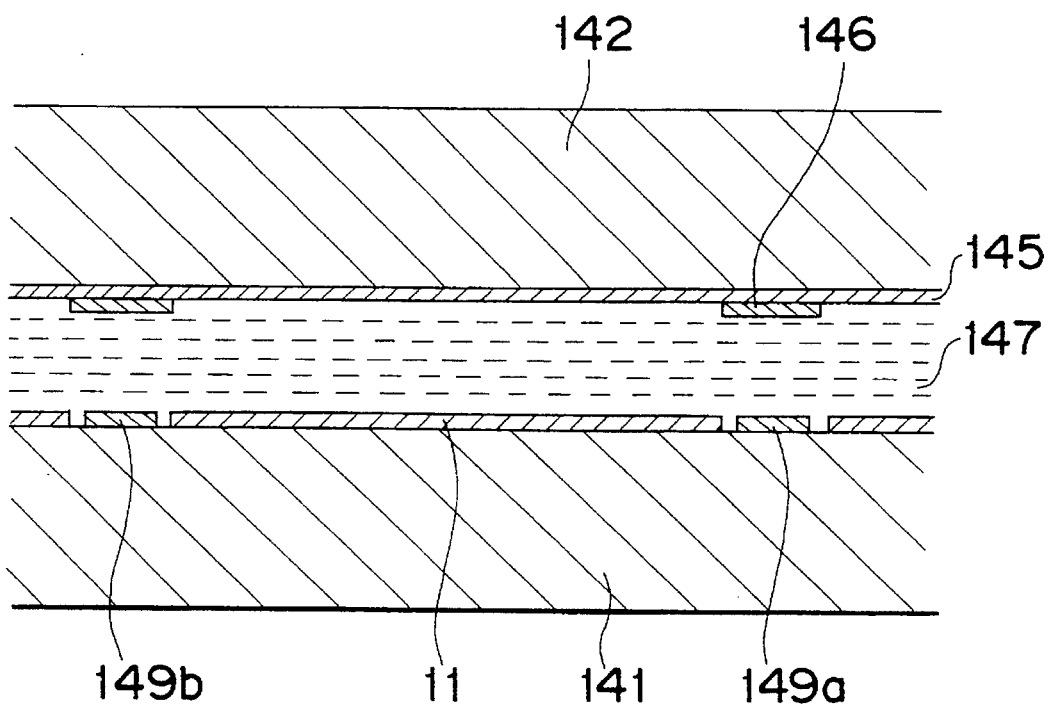

A liquid crystal display device according to a first embodiment of the present invention will now be described with reference to FIGS. 1(a) to 1(c), it being to be noted that in these figures a portion of the liquid crystal display device which is irrelevant to the description of the present invention is not illustrated for the sake of brevity. Thus, FIG. 1(a) illustrates a plan view of one pixel in the liquid crystal display device according to the first embodiment of the present invention and FIGS. 1(b) and 1(c) are cross-sectional views taken along the respective lines A–A' and B–B' employed in FIG. 1(a). In each of FIGS. 1(a), 2 and 4, only a plan view of an array substrate 141 of the liquid crystal display device is shown with a counterelectrode substrate 142 thereof removed.

Figure 10A:
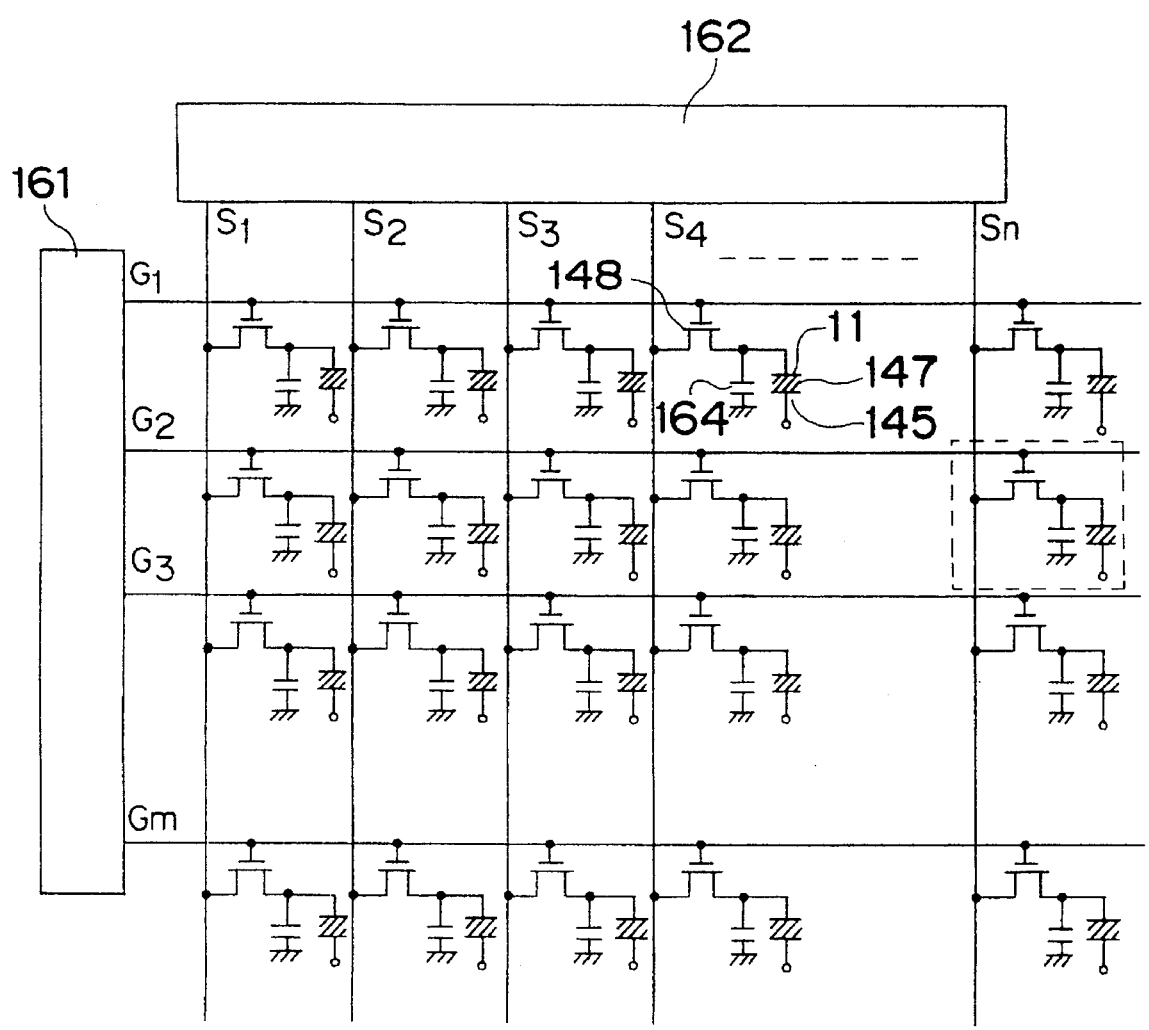
FIGS. 10(a) and 10(b) are diagram showing equivalent circuits of liquid crystal panels.

An electric equivalent circuit of the liquid crystal display device is shown in FIG. 10(a). Reference characters S1 to Sn represent respective source signal lines and reference characters G1 to Gm represent respective gate signal lines. A thin-film transistor 148 as a switching element is formed at a point of intersection between each source signal line and any one of the gate signal lines. The thin-film transistor 148 has three terminals, one connected with the gate signal line, another one with the source signal line and the remaining terminal with a corresponding pixel electrode 11 of a pixel. A capacitance 164 is connected with said terminal since the charge of a liquid crystal layer 147 is unable to accumulate charges during one frame period. It is to be noted that an area encased by the dot-lined square in FIG. 10(a) represents a single pixel.

A gate drive IC (integrated circuit) 161 feed the gate signal lines with a voltage necessary to switch any one of the thin-film transistors on or off thereby to control an OFF/ON state of the thin-film transistor. On the other hand, a source drive IC 162 outputs a sampled video signal to any one of the source signal lines.

As shown in FIG. 1(b) and FIG. 1(c), a glass substrate 141 has source signals 143 and gate signals 149 formed thereon. The thin-film transistor 148 is formed at a point of intersection between each source signal line 143 and any one of the gate signal lines 149. An insulating thin-film 12 is formed over the source signal line 143, and a pixel electrode 11 is formed so as to overlap a portion of the source signal line 143 through the insulating thin-film. The insulating thin-film may be made of $SiN_x$, $SiO_2$, $TaO_x$ or $Al_2O_3$.

A pixel electrode 11 has a size within the range of 30×30 μm to 100×100 μm, and the source signal line has a line width within the range of about 3 to 15 μm. The distance t between each neighboring pixels is preferably chosen to be as small as possible. If the distance t is relatively large, a shielding effect to shield the electric field developed from the signal lines will be reduced.

On the other hand, a counter substrate 142 is formed with a counterelectrode 145 and also with a black matrix 146 at a location aligned with each pixel electrode. The black matrix is in the form of a metallic thin-film generally made of chromium and having a film thickness of about 0.1 μm.

The pixel electrode 11 is not formed above the corresponding thin-film transistor 148, particularly above a portion where a semiconductor layer of the corresponding thin-film transistor is formed. Although in a reflective thin-film transistor array suggestion had once been made to form the pixel electrode above the thin-film transistor, this suggestion did not work out in practice. One reason therefor is because of an occurrence of a phenomenon known as a back gate in which the pixel electrode becomes a gate electrode, accompanied by a reduction in the OFF characteristic of the thin-film transistor due to a potential of the pixel electrode to such an extent as to result in a leakage of charges accumulated on the pixel electrode. In the present invention, however, the above discussed phenomenon has been extensively resolved and, in order to avoid the occurrence of the above described phenomenon, the pixel electrode 11 is not formed above the corresponding thin-film transistor.

The liquid crystal layer 147 has a thickness within the range of 4 to 6 μm, the orientation of which is along the source signals 143. The direction of orientation of the counter substrate 145 lies perpendicular to the direction of the above described orientation (hereinafter referred to as a parallel rubbing). In the prior art TN liquid crystal display device, orientation is carried out at an angle of 45 degrees relative to the source signals (hereinafter referred to as a 45° rubbing) and, for example, in a direction from top left down to bottom right as viewed in FIG. 1(a). With the 45° rubbing, the electric field developed from the signal lines considerably affects the liquid crystal molecules, having a relatively large surface area at which the reverse-tilt domain occurs. Therefore, if the rubbing is carried out along the signal lines, the surface area at which the reverse-tilt domain occurs can be reduced.

Figure 6:
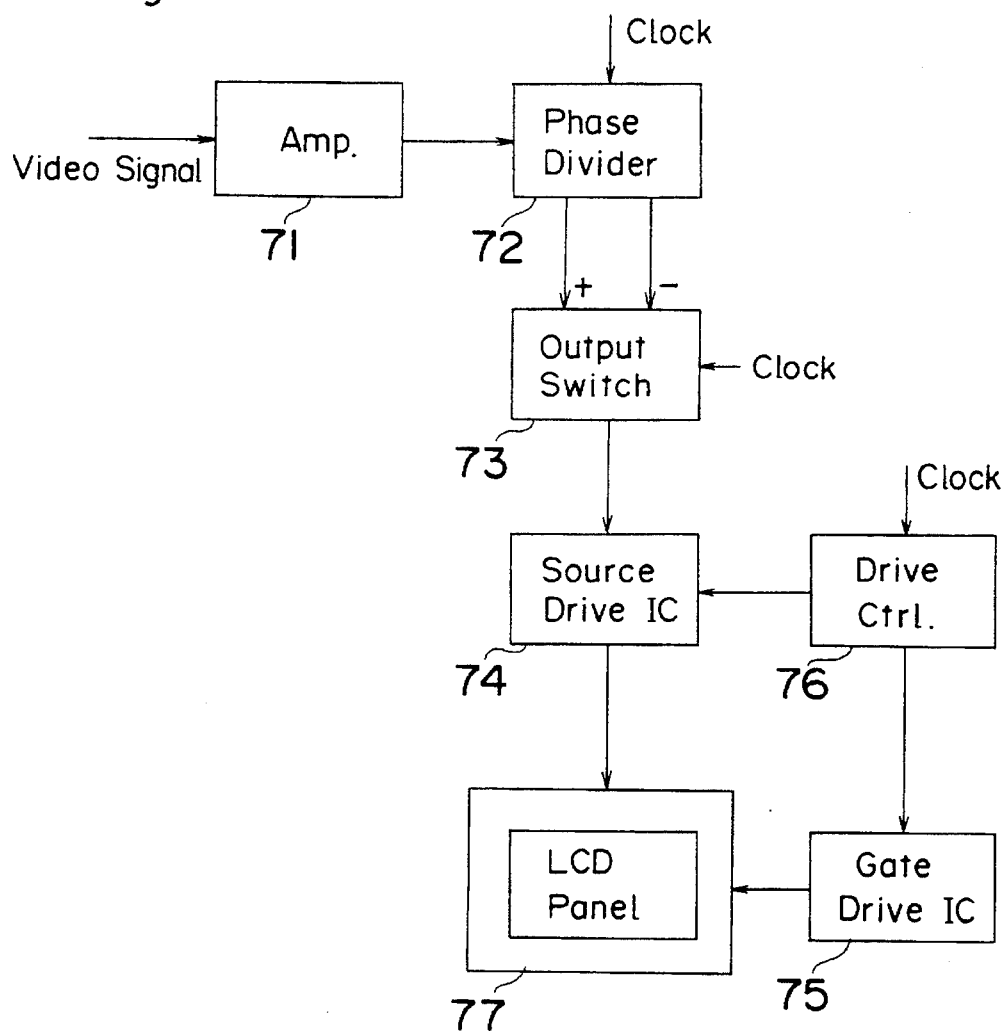
FIG. 6 is a block circuit diagram of the liquid crystal display device of the present invention.

Hereinafter, a drive circuit for and a method of driving the liquid crystal display device of the present invention will be described. FIG. 6 illustrates the drive circuit. In this figure, reference numeral 71 represents an amplifier for adjusting the gain of a video signal, inputted thereto, so that the video signal can satisfy an electrooptical characteristic of a liquid crystal panel. Since a set-up voltage of the TN liquid crystal panel is generally within the range of 1.5 to 2.0 volts and since the voltage at which the maximum transmissivity is attained is substantially 5.0 to 6.0 volts, the pedestal level and the amplitude of the video signal are amplified to meet this range of voltage. The gain-adjusted video signal is subsequently fed to a phase divider circuit 72 by which the input video signal is divided into two video signal components of opposite polarities, i.e., positive and negative, before they are outputted to an output switching circuit 73.

With the positive and negative video signal components supplied to the output switching circuit 73, the output switching circuit 73 issues a video signal necessary to vary the polarity of a signal to be applied to the corresponding pixel for each field, said video signal being then supplied to the source drive IC 74. Reversion of the polarity for each field in the manner described above is for the purpose of ensuring an application of an alternating voltage to the liquid crystal material thereby to avoid a degradation of the liquid crystal material. The source drive IC 74 operates in response to a control signal from a drive control circuit 76 to shift the level of the video signal and then to apply it to the liquid crystal panel 77 in synchronism with the gate drive IC 75.

The driving method will now be described. As hereinabove discussed, the signal having a polarity reversed for each field is applied to each pixel of the liquid crystal panel 77. Along therewith, signals of opposite polarities are applied to neighboring source signal lines. In other words, if at a given time the signal of a positive polarity is applied to the first source signal line, the signal of a negative polarity is applied to the second source signal line neighboring the first source signal line. As a matter of course, not only do the signals applied to the first and second source signal lines differ from each other in respect of polarity, but the amplitude of the video signal does also vary depending on the nature of the image to be displayed. However, the amplitude does not vary so considerably since respective display luminances of images displayed by the neighboring pixels are substantially similar to each other.

The condition at that time is shown in FIGS. 9(a) and 9(b). In these figures, a single square block represents a single pixel while a sign + represents a positive polarity of a voltage retained and a sign − represents a negative polarity of a voltage retained. Assuming that the condition of FIG. 9(a) represents a drive condition at a certain time, that is, at a certain field, a drive condition that establish after one field period is such as shown in FIG. 9(b). The reason for the application of the signals of opposite polarities to the neighboring source signal lines in the manner described above will now be discussed.

Figure 3A:
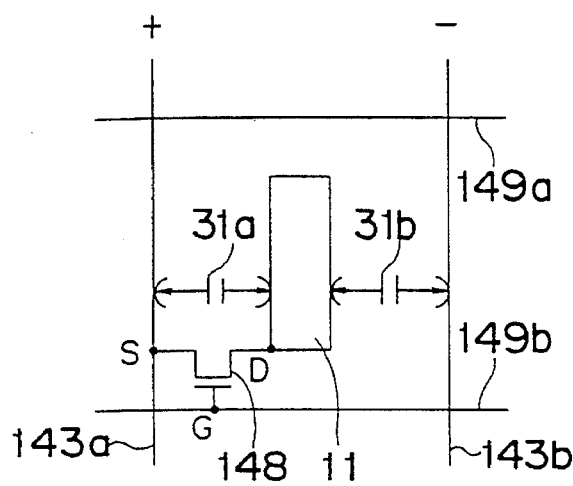
FIGS. 3(a) and 3(b) are explanatory diagrams used to explain the liquid crystal display device of the present invention.

As shown in FIG. 3(a), parasitic capacitances 31a and 31b are generated between the pixel electrode 11 and the source signal 143a and between the pixel electrode 11 and the source signal line 143, respectively. Let it be assumed that, as shown in FIG. 3(a), the signal of positive polarity and the signal of negative polarity are applied respectively to the source signal line 143a and the source signal line 143b. Assuming again that, while the polarity differs between the respective signals applied to the source signal lines 143a and 143b, the amplitude of the signal applied to the source signal line 143a is substantially equal to that applied to the source signal line 143b and the parasitic capacitances 31a and 31b are substantially equal to each other, the parasitic capacitances 31a and 31b counterbalance with each other at the pixel electrode 11 and, therefore, no variation in potential occur at the pixel electrode 11. Accordingly, it can be deemed that the parasitic capacitances which are generated as a result of the overlapping between the pixel electrode 11 and the source signal lines no longer exists.

Figure 2:
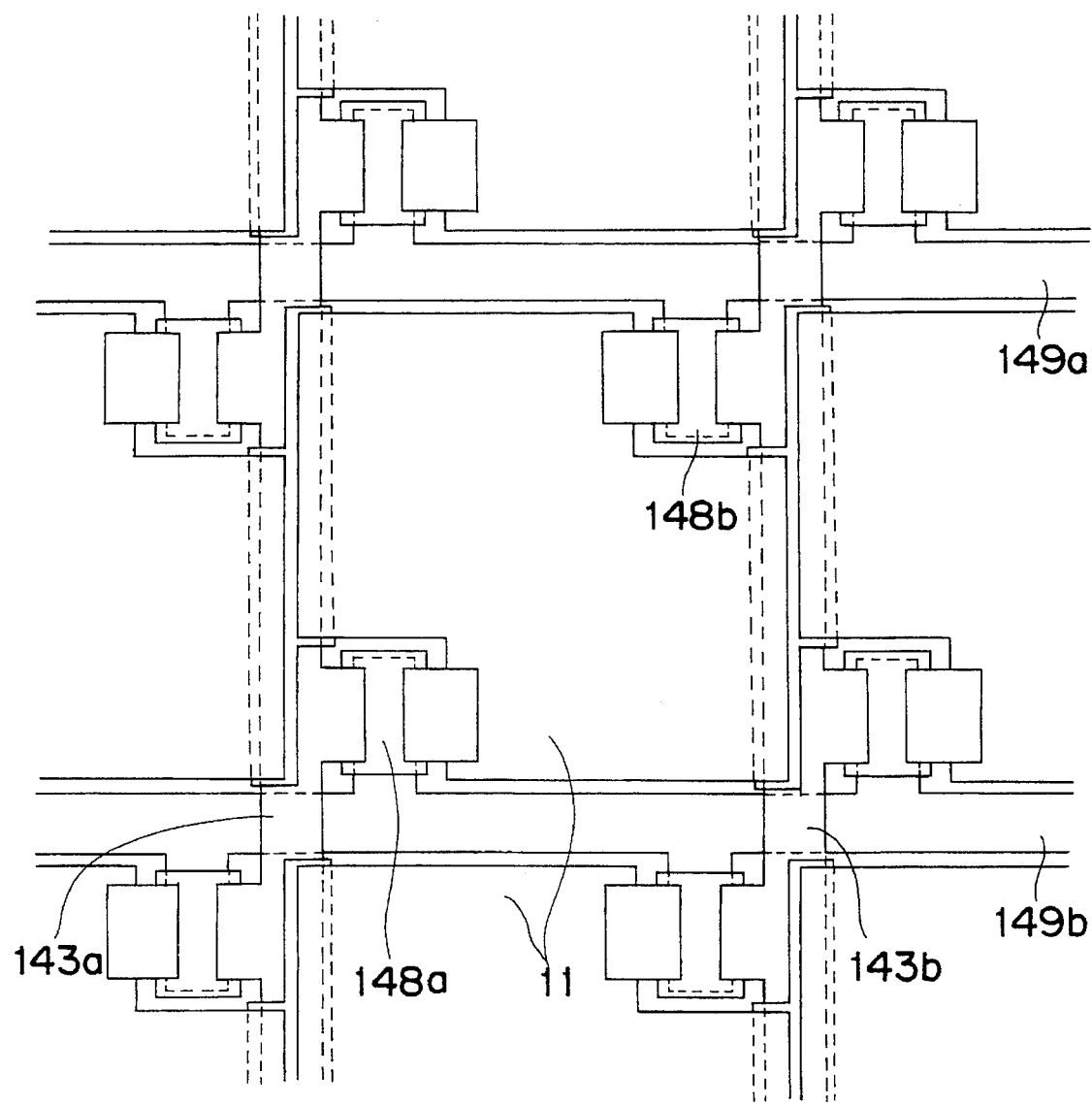
FIG. 2 is a view similar to FIG. 1(a), showing the liquid crystal display device according to a second preferred embodiment of the present invention.
Figure 3B:
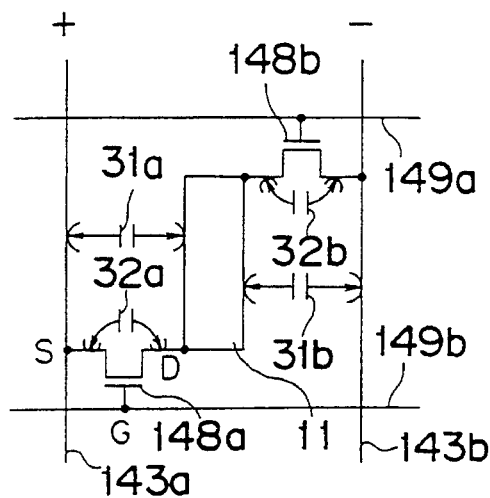

The liquid crystal display device according to a second preferred embodiment of the present invention will now be described with reference to FIG. 2 showing a plan view of one pixel employed in the liquid crystal display device. In this figure, reference numerals 148a and 148b represent a thin-film transistor. FIG. 2 differs from FIG. 1(a) in that the two thin-film transistors are formed for each pixel and, therefore, only this difference will be described. As FIG. 2 makes it clear, in the liquid crystal display device according to the second embodiment of the present invention, the two thin-film transistors are employed for each pixel, an electric equivalent circuit of which is shown in FIG. 3(b). In this figure, reference numerals 32a and 32b represent a parasitic capacitance produced between the drain and the source of each thin-film transistor. The thin-film transistors 148a and 148b are connected to the different gate and source signal lines. The drive circuit and the driving method are similar to those discussed in connection with the first preferred embodiment of the present invention and, therefore, are not reiterated for the sake of brevity.

In the liquid crystal display device according to the second embodiment of the present invention, since the two thin-film transistors are formed at respective locations spaced diagonally as clearly shown in FIG. 3(b), the surface area at which the pixel electrode overlaps the source signal line at one of the locations is equal to that at the other of the locations and, therefore, when the thin-film transistors are in a non-conducting state, the parasitic capacitance between the source signal line 143a and the pixel electrode 11 and that between the source signal line 143b and the pixel electrode 11 are completely equal to each other. In the liquid crystal display device according to the first embodiment of the present invention shown in FIG. 3(a), there is the parasitic capacitance between the drain and the source of the thin-film transistor 148. Accordingly, with the liquid crystal display device according to the first embodiment of the present invention, the parasitic capacitance between the source signal line 143a and the pixel electrode 11 corresponds to the sum of the parasitic capacitance 31a and the parasitic capacitance between the drain and the source of the thin-film transistor 147 then held in the non-conducting state while the parasitic capacitance between the source signal line 143b and the pixel electrode 11 merely corresponds to the parasitic capacitance 31b. In view of this, an unbalance occurs between the parasitic capacitance between the source signal line 143a and the pixel electrode 11 and that between the source signal line 143b and the pixel electrode 11 and, therefore, the potential of the pixel electrode 11 tends to vary to a certain extent by the voltage applied to the source signal lines.

However, with the liquid crystal display device according to the second embodiment of the present invention, the capacitance between the source signal line 143a and the pixel electrode 11 becomes equal to that between the source signal line 143b and the pixel electrode 11. Accordingly, when the liquid crystal display device according to the second embodiment of the present invention is driven using the driving method described with reference to FIG. 9, the potential of the pixel electrode 11 is no longer affected by the voltage applied to the source signal lines.

Figure 4:
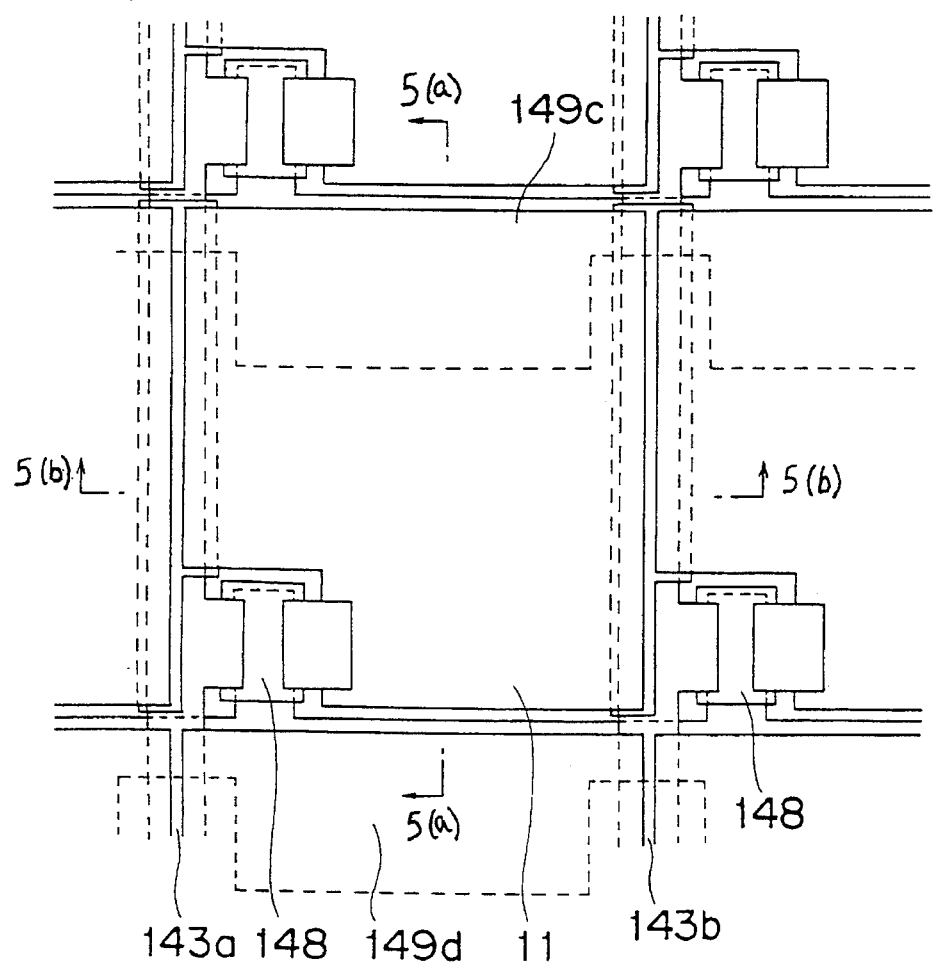
FIG. 4 is a view similar to FIG. 1(a), showing the liquid crystal display device according to a third preferred embodiment of the present invention.
Figure 5A:
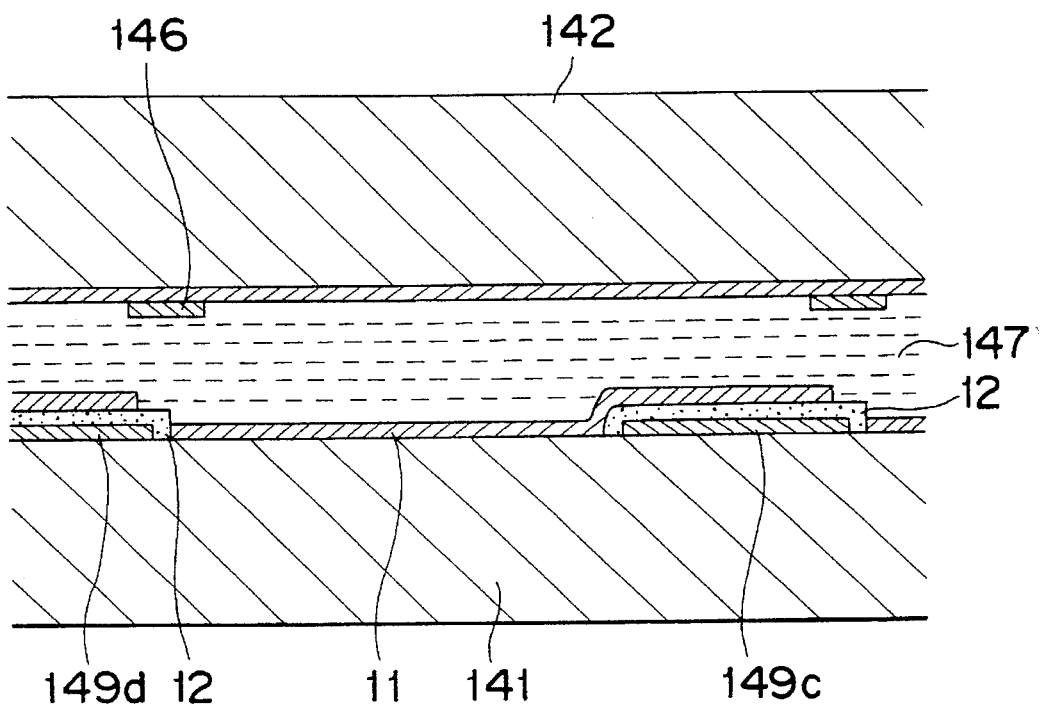
FIGS. 5(a) and 5(b) are cross sectional views of that portion of the liquid crystal display device taken along the lines 5(a)—5(a) and 5(b)—5(b) in FIG. 4.
Figure 5B:
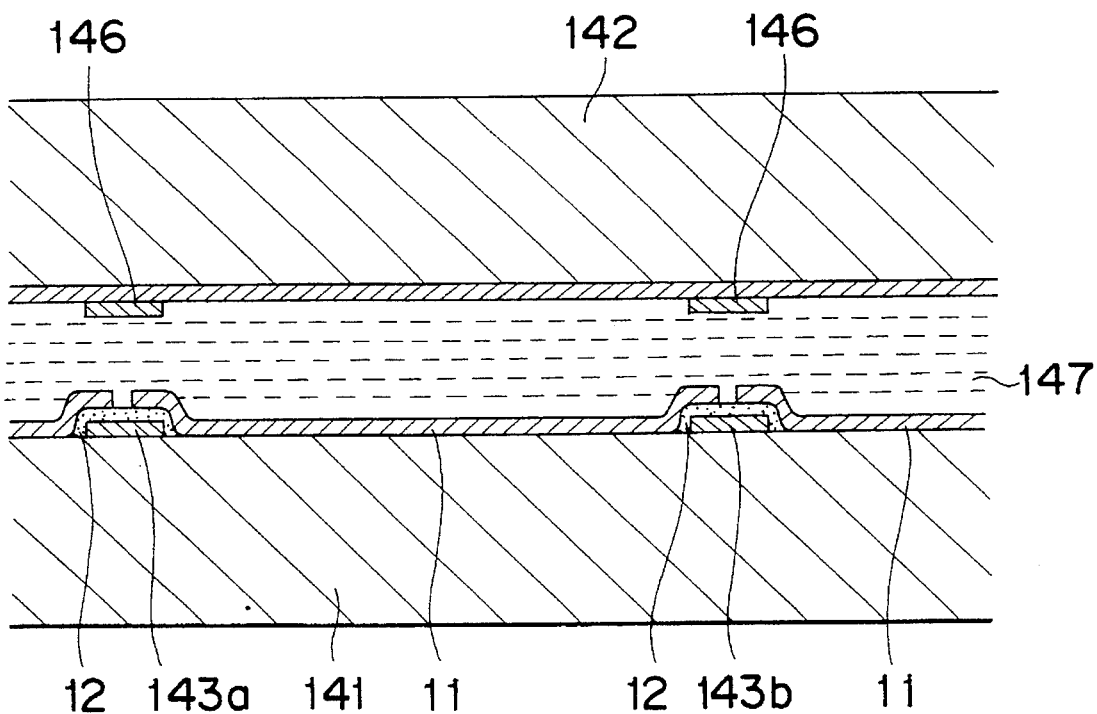
Figure 10B:
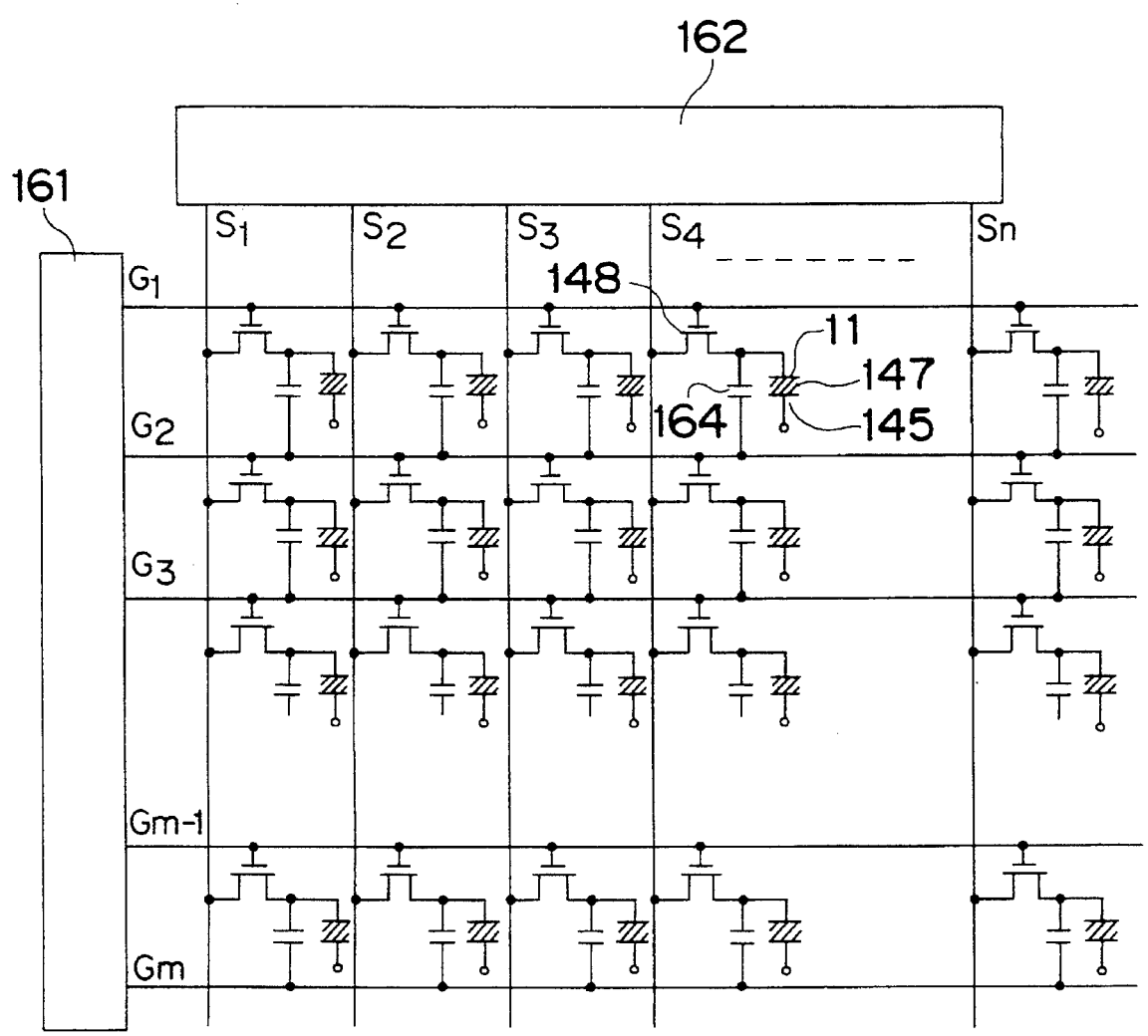

FIG. 4 illustrates a plan view of one pixel employed in the liquid crystal display device according to a third embodiment of the present invention. Cross-sectional views of it taken along the lines C–C' and D–D' shown in FIG. 4 are shown in FIGS. 5(a) and 5(b), respectively. An electric equivalent circuit thereof is shown in FIG. 10(b). An added capacitance 164 is formed using the pixel electrode 11 and the gate signal line 149 as electrodes. An insulating thin-film 12 is formed between the gate signal line 149 and the pixel electrode 11.

With the structure shown in FIG. 10(a), one of the electrodes of the added capacitance 164 requires to be formed as a common electrode. However, with the structure shown in FIG. 10(b), since the gate signal line is so formed as to have a line width matching with the added capacitance 164 and is used as an electrode, the number of masks required during the process of manufacturing the liquid crystal display device can be advantageously reduced.

Important of all is that, since the gate signal line 149 is overlaid above the pixel electrode 11, the electric field developed from the gate signal line can be shielded. With the structure shown in FIG. 1, since the pixel electrode 11 has been overlaid above the source signal lines, the influence which might be brought by the electric field from the source signal line on the liquid crystal layer could be considerably minimized, but the electric field developed from the gate signal line cannot be shielded resulting in the generation of the somewhat reverse-tilt domain in the vicinity of the gate signal line which has in turn resulted in the light leakage. With the structure shown in FIG. 4, since the gate signal line is shielded by the pixel electrode 11, considerable minimization of the occurrence of the reverse-tilt domain is possible. Other structural features of the liquid crystal display device shown in FIG. 4 are identical or similar to those described in connection with the first embodiment of the present invention and, therefore, they are not reiterated for the sake of brevity.

Hereinafter, some embodiments of the projection display system according to the present invention, in which the above discussed liquid crystal display device is utilized as a light valve, will be described with reference to the accompanying drawings.

Figure 11:
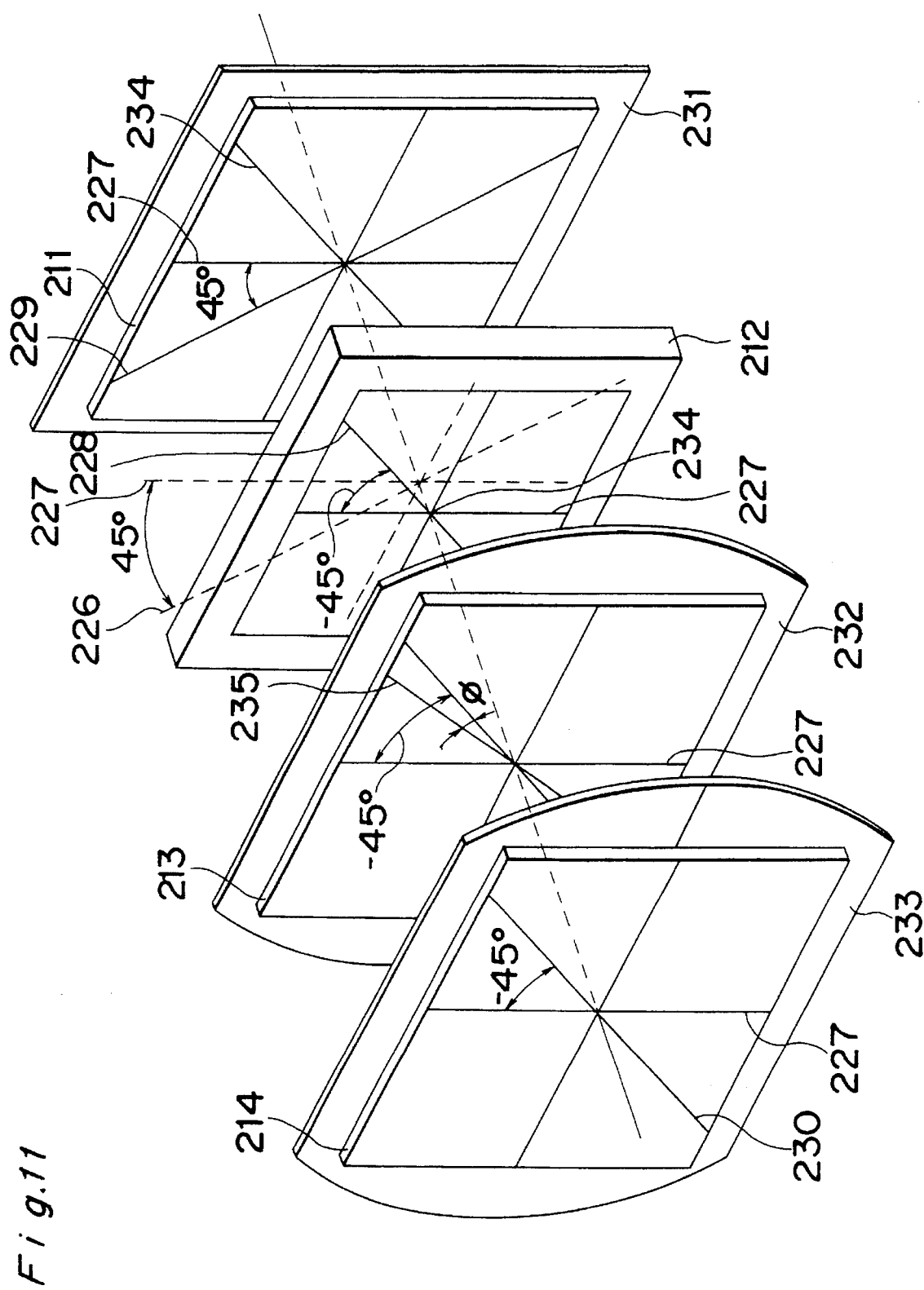
FIG. 11 is an exploded view showing a projection display system according to the present invention.

FIG. 11 illustrates a schematic structure of an important portion of the projection display system according to the present invention, wherein reference numeral 211 represents an inlet polarizing plate disposed on one side of a liquid crystal display device 212 of the present invention adjacent a light source (not shown), reference numeral 213 represents a phase difference plate which is a phase compensating means, and reference numeral 214 represents an exit polarizing plate disposed on the other of the liquid crystal display device 212 remote from the light source.

The light valve includes, in the successive order from the side of the light source, the inlet polarizing plate, the liquid crystal display device 212, the phase difference plate 213 and the exit polarizing plate 214, all of which are separate from each other, but are disposed parallel to each other.

The phase difference plate 213 is of a kind formed by drawing a film of polyvinyl alcohol (PVA) in one direction by a drawing or stretching machine to have a birefringence. Since the phase difference plate 213 has a refractive index which is high in a direction conforming to, but low in a direction perpendicular to the stretching direction in which it has been stretched, the direction conforming to the stretching direction forms a phase delaying axis whereas the direction perpendicular to the stretching direction forms a phase advancing axis. The film has a thickness of 20 µm and a retardation of 22 nm at a wavelength of 540 nm which is considerably small as compared with the visible wavelength Each of the inlet polarizing plate 211, the phase difference plate 213 and the exit polarizing plate 214 is mounted on a respective frame 231, 232 and 233. Of them, the two frames 232 and 233 are rotatable about the normal to the liquid crystal layer which extends in alignment with the center of an image display area of the liquid crystal display device 212, so that the angle of any one of the phase advancing axis 235 of the phase difference plate 213 and the polarizing axis 230 of the exit polarizing plate 214 relative to a vertical direction 227 of the image display area can be adjusted. The direction of the phase advancing axis 235 of the phase difference plate 213 can be adjusted within the range of −45° to 45° relative to an absorbing axis 234 of the inlet polarizing plate 211. It is to be noted that, in the structure shown in FIG. 11, arrangement may be made that the direction of the phase advancing axis of the phase difference plate 213 can be adjusted within the range of −45° to 45° relative to the absorbing axis 234 of the inlet polarizing plate 211.

Adjustment of the contrast of the liquid crystal display device is carried out in the following manner. While the phase delaying axis 235 of the phase difference plate 213 and the polarizing axis 230 of the exit polarizing plate 214 are made parallel to each other, a predetermined drive voltage necessary to accomplish a black display on the image display area of the liquid crystal display device 212 is applied. Then, while an image displayed by the liquid crystal display device 212 is viewed from a predetermined direction, the exit polarizing plate 214 is rotated to a position at which the luminance of the image displayed attains a minimum value, followed by a rotation of the phase difference plate 213 to make the contrast optimum. In most cases, this procedure is sufficient to adjust the contrast, but where the luminance of the image being displayed varies, it is recommended to adjust the uniformity of the luminance by alternately displacing the exit polarizing plate 214 and the phase difference plate 213 slightly. By this adjustment, it is possible to accommodate a variation in direction of the polarizing axis of the inlet polarizing plate 211, a variation of the degree of polarization of elliptically polarized light emerging from the liquid crystal display device 212 and a variation in retardation of the phase difference plate 213.

Thus, the projection display system utilizing the liquid crystal display device as shown in FIG. 11 is effective to provide a display of a high-quality image having a favorable contrast since the provision of the phase difference plate 213 having a small retardation considerably improves the transmissivity at the black display even though the transmissivity at a white display may decrease slightly.

Figure 12:
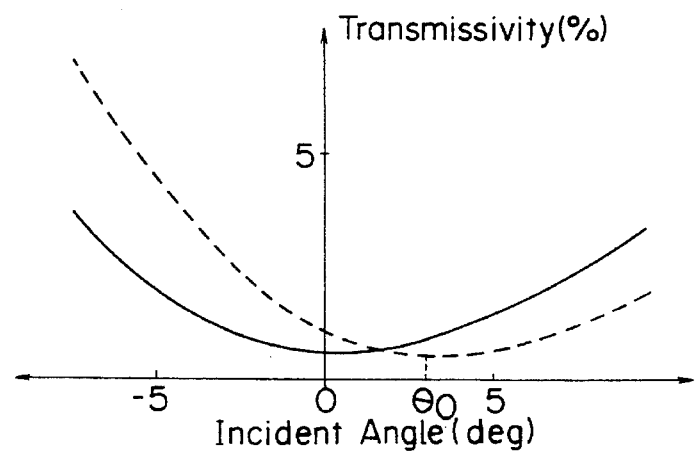
FIG. 12 is a graph showing a characteristic of a light valve used in the projection display system according to the present invention.
Figure 13:
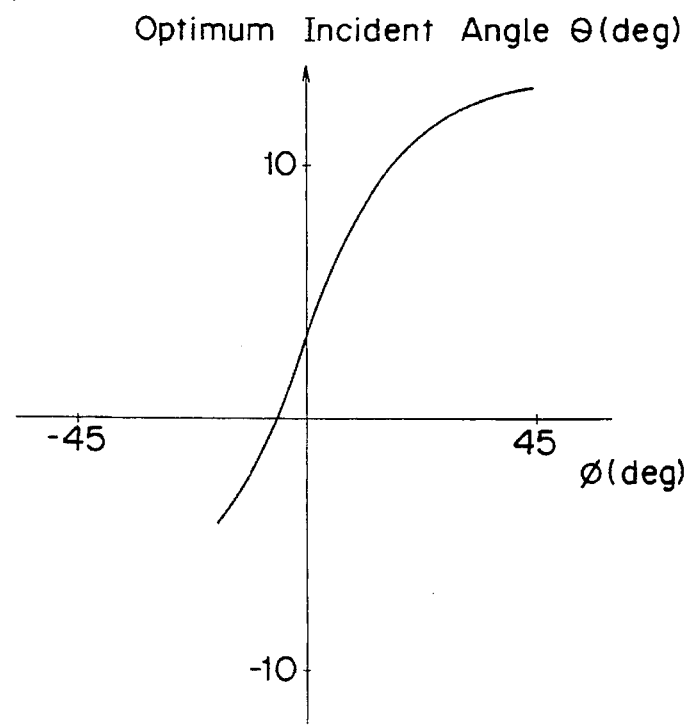
FIG. 13 is a graph showing a characteristic of a light valve used in the projection display system according to the present invention.

Hereinafter, an experiment conducted with the use of the projection display system shown in FIG. 11 will now be described. When the driving voltage for the liquid crystal display device was chosen to be 5.0 volts and adjustment was made so that the transmissivity exhibited when rays of light are incident at right angles attained a minimum value, the relationship between the transmissivity and the angle θ of incidence of the incoming light was such as shown by a solid curve in the graph of FIG. 12. The incident light falls within a plane containing both of the normal to the substrate and the vertical direction of the image display area. The angle φ of the direction of the phase advancing axis 235 of the phase difference plate 213 relative to the polarizing axis 230 of the exit polarizing plate 214 was found to be 5°. A curve shown by the broken line in the graph of FIG. 12 was that exhibited when no phase difference plate 213 was employed, the minimum transmissivity having been exhibited when the incident angle was 3°. It is to be noted that the characteristic which is exhibited when the incident rays of light fall within the plane containing the normal to the liquid crystal layer and the direction parallel to the image display area is substantially symmetrical with respect to a left-to-right direction. FIG. 12 makes it clear that the transmissivity exhibited when the rays of light are incident at right angles can be reduced by the use of the phase difference plate. It is also clear that the minimum value of transmissivity when the phase difference plate is used is substantially equal to that when no phase difference plate is employed. In other words, the use of the phase difference plate improves the contrast.

Where the incident rays of light fall within a plane containing the normal to the substrate and the vertical direction of the image display area and if the incident angle at which the transmissivity at the black display attains a minimum value is expressed by $θ_o$, the relationship between the optimum incident angle $θ_o$ and the angle of direction φ of the phase difference plate 213 is such as shown in the graph of FIG. 13. From the graph of FIG. 13, it is clear that rotation of the phase difference plate results in a variation of the incident angle at which the transmissivity at the black display attains a minimum value. Where θ=0°, it is the same with the case in which no phase difference plate 213 is employed and, hence, $θ_o$=3.0°. Where the phase difference plate 213 is employed, $\theta_o=+1°$ to $+8°$ relative to $\phi=-5°$ to $+10°$. From the graph of FIG. 13, it is also clear that the use of the phase difference plate 213 has shifted the optimum incident angle $\theta_o$ by 3 to 4 degrees and a favorable contrast can be obtained even though the rays of light are incident at right angles. Also, when an experiment was conducted with the phase delaying and advancing axes of the phase difference plate 213 interchanged, a characteristic could be obtained which corresponds to the graph of FIG. 13 turned about the axis representing the optimum incident angle.

The angle $\phi$ defined between the phase advancing axis 235 of the phase difference plate 213 and the polarizing axis 230 of the exit polarizing plate 214 varies with a retardation of the phase difference plate 213. The smaller the retardation, the greater the angle $\phi$. A result of examination has shown that the retardation of the phase difference plate at 540 nm is to be chosen from the range of 5 to 50 nm. If the retardation is smaller than 5 nm, the elliptically polarized light emerging from the liquid crystal display device 213 cannot be converted into linearly polarized light. On the other hand, if the retardation is greater than 50 nm, the sensitivity is too high during the rotation of the phase difference plate 213 to make the adjustment difficult.

The phase difference plate 213 may be in the form of an optical crystal such as, for example, quartz or mica, or a stretched transparent resin film made of any one of fluorinated vinylidene, triacetate, diacetate, cellophane, polyether sulphone (PES), polyether ethersulphone (PEES), polysulfone, polycarbonate, polyethylene terephthalate (PET), polyvinyl alcohol (PVA), saran, and polyarylate. Since the optical crystal is generally expensive, the use of the stretched transparent resin film is favored. It is to be noted that the phase difference plate may be in the form of a film or a plate or in the form of a glass substrate to which the phase difference film is affixed. Of the various materials, polycarbonate, PES or PVA is considered optimum because of ease to process, a good lifetime and a good uniformity in characteristic. A combination of a plurality of stretched transparent resin films each made of any of the materials listed above, may also be employed for the phase difference plate.

Figure 14:
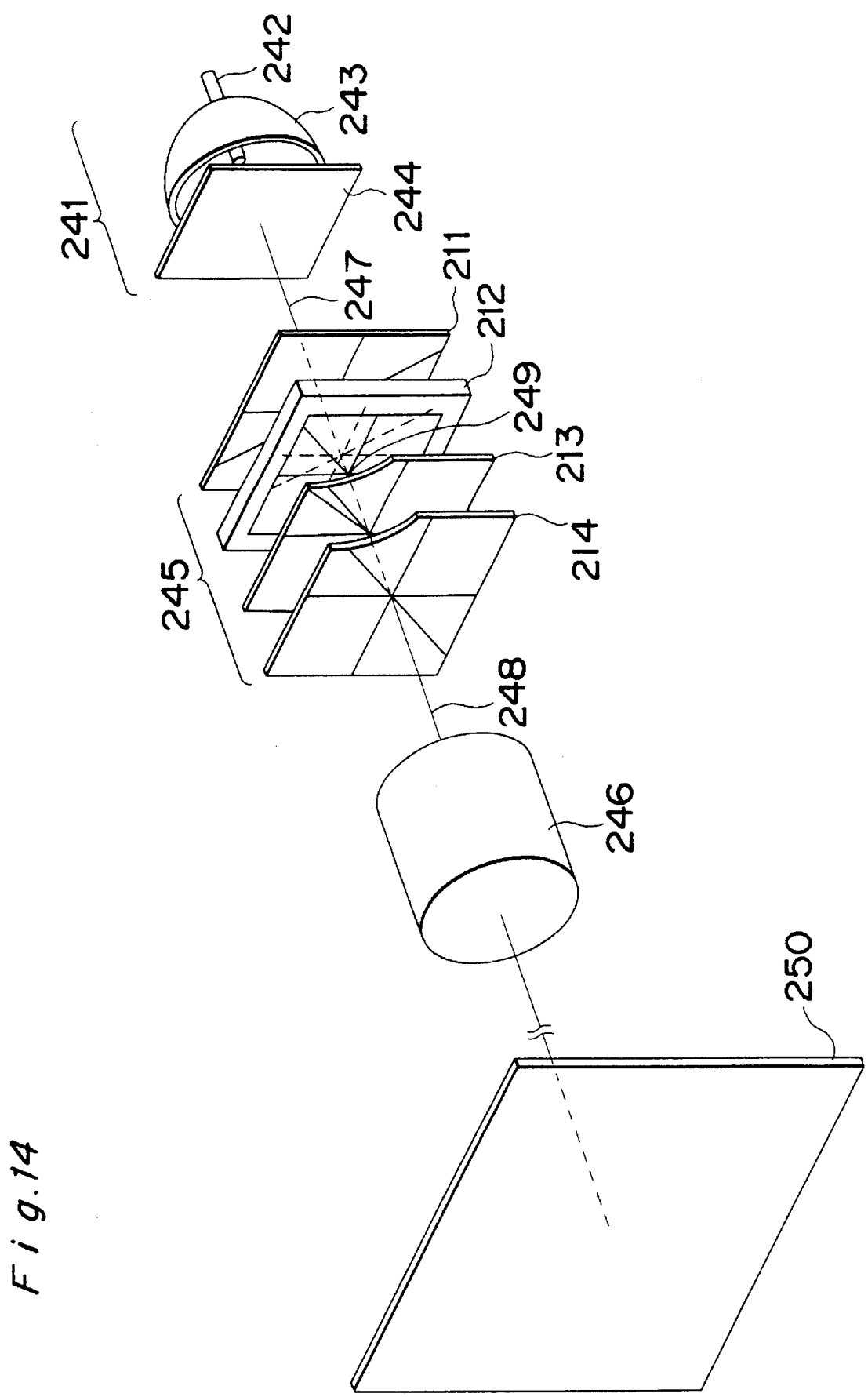
FIG. 14 is an exploded view showing the projection display system according to the present invention.

FIG. 14 illustrates a schematic structure of a second embodiment of the projection display system according to the present invention, wherein reference numeral 241 represents a light source, reference numeral 212 represents the liquid crystal display device and reference numeral 246 represents a projection lens.

The light source 241 includes a lamp 242 which is preferably a halogen lamp, a concave mirror 243 and a filter 244. Rays of light emitter from the lamp 241 are collected and converted by the concave mirror 242 into a bundle of substantially parallel rays of light which are subsequently incident on the filter 244. The filter 244 is in the form of a glass substrate deposited with a multi-layered coating operable to reflect infrared rays of light, but to pass visible rays of light therethrough. The rays of light from the light source 241 then pass through the liquid crystal display device 212 before they are incident on the projection lens 246.

An optical axis 247 of the light source 241 aligns with an optical axis 248 of the projection lens 246 and the center 249 of the image display area of the liquid crystal display device 212 lies on the optical axis 248 while the liquid crystal layer 217 lies perpendicular to the optical axis 248. The projection lens 246 is telecentric, that is, all of primary rays of light incident on the projection lens 246 from various pixels of the liquid crystal display device 212 are substantially parallel to the optical axis 248.

As a variation of the transmissivity, a full color optical image is formed by the liquid crystal display device 212, which image is projected by the projection lens 246 onto a screen 250 on an enlarged scale. It is recommended to make the contrast optimum by rotating the exit polarizing plate 214 and/or the phase difference plate 213. Since the phase difference plate 213 compensate for a slight retardation at the black display of the liquid crystal display device 212, the transmissivity at the black display decreases thereby to secure a projected image of high contrast.

In the structure shown in FIG. 14, when the image display area of the liquid crystal display device 212 was so sized as to have 60 mm in a horizontal direction and 46 mm in a vertical direction and the projection lens 246 used had an aperture ratio of F3.5, and when the maximum driving voltage of the liquid crystal display device 212 was 5.2 volts, the contrast at the center of the projected image was 130:1 when no phase difference plate 213 was employed and 210:1 when the phase difference plate 213 was employed. This makes it clear that the use of the phase difference plate 213 is effective to considerably increase the contrast of the projected image. It is to be noted that the phase difference plate 213 may be disposed between the liquid crystal display device 212 and the inlet polarizing plate 211 as shown in FIG. 15.

Figure 15:
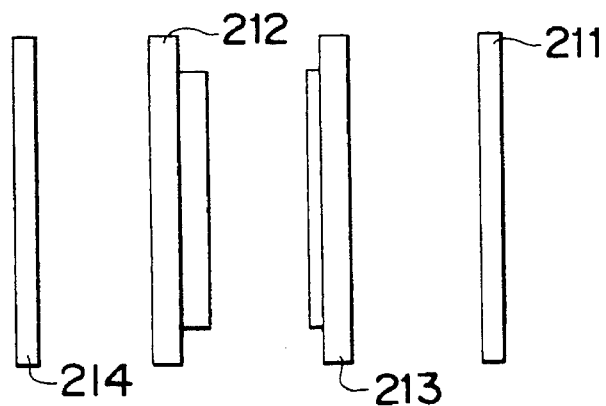
FIG. 15 is a diagram showing the structure of the light valve used in the projection display system according to the present invention.

In the structure shown in FIG. 11 and FIG. 15, if the phase difference plate 213 has a small retardation, the phase difference plate 213 may be affixed to one of the inlet polarizing plate 211, the liquid crystal display device 212 and the exit polarizing plate 214. Where the phase difference plate 213 is affixed or bonded to the liquid crystal display device, the direction of the phase advancing axis tends to be displayed relative to a predetermined direction by, for example, ±1°. However, where the retardation of the phase difference plate 213 is small of about 20 nm, the sensitivity of the angle of rotation of the phase difference plate 213 relative to the contrast is so low that no practical problem occur even through the direction of the phase advancing axis of the phase difference plate 213 displace by about ±1° from the predetermined direction.

Where the phase difference plate 213 is affixed to one of the inlet polarizing plate 211, the liquid crystal display device 212 and the exit polarizing plate 214, surface reflection which occurs at an interface between the combined members can be reduced allowing the transmissivity of the liquid crystal display device to increase. The inlet polarizing plate 211 absorbs a portion of the incident light to evolve heat which is in turn transmitted to the liquid crystal display device 212 accompanied by an increase of temperature of the liquid crystal display device 212, and therefore, it is preferred that the inlet polarizing plate 211 and the liquid crystal display device 212 be separated from each other.

It is to be noted that, in FIG. 11, for the sake of clarity, the polarizing axis 230 is shown as inclined 45 degrees relative to the vertical direction 227 of the image display area. In the light valve of the present invention, when the orientation treatment is carried out along the source signal lines, the polarizing axis 230 matches with the vertical direction 227 of the image display area. Accordingly, it is needless to say that the phase advancing axis 235 lies perpendicular to the vertical direction 227 of the image display area.

In order to suppress an extraordinary orientation, one of the substrates forming the liquid crystal cell is to be rubbed along the source signal lines, that is, in the vertical direction of the image display area while the other of the substrates is to be rubbed along the gate signal lines, that is, in a horizontal direction of the image display area. In such case, the viewing characteristic will become symmetrical within a plane containing the direction inclined 45° relative to the vertical direction of the image display area and the normal to the substrate, but non-symmetrical within a plane perpendicular thereto. Within the plane in which the viewing characteristic is non-symmetrical, the relationship between the transmissivity at the black display and the incident angle tends to be similar to that shown in FIG. 12. For this reason, in the projection display system in which the prior art NW mode TN liquid crystal display device and arrangement is made to allow the primary rays of light to be incident on the center of the image display area of the liquid crystal cell at right angles thereto, the image quality of the projected image does not shown a symmetry with respect to the left-to-right direction, but shows a symmetry with respect to the diagonal direction, and therefore, an unevenness of the image quality tends to be conspicuous.

On the other hand, in the projection display system of the present invention, since the optimum incident angle can be adjusted to 0° by rotating the phase difference plate, and if the projection lens is telecentric, it is possible to obtain the projected image of high quality while exhibiting a good uniformity in image quality. Moreover, the employment of the parallel rubbing makes it possible to reduce the light leak by, for example, about 20%, the line width of the black matrix can be reduced, allowing the aperture to increase and in turn to increase the display luminance. As hereinabove discussed, where the parallel rubbing is carried out, the polarizing axis 230 is made to coincide with the vertical direction 227 of the image display area as shown in FIG. 11. Also, it is recommended to place the phase advancing axis 235 at a position rotated 45°.

The effect of preventing the light leak afforded by the parallel rubbing process can be equally applied to the projection display system utilizing three light valves as will be described hereinafter.

Figure 16:
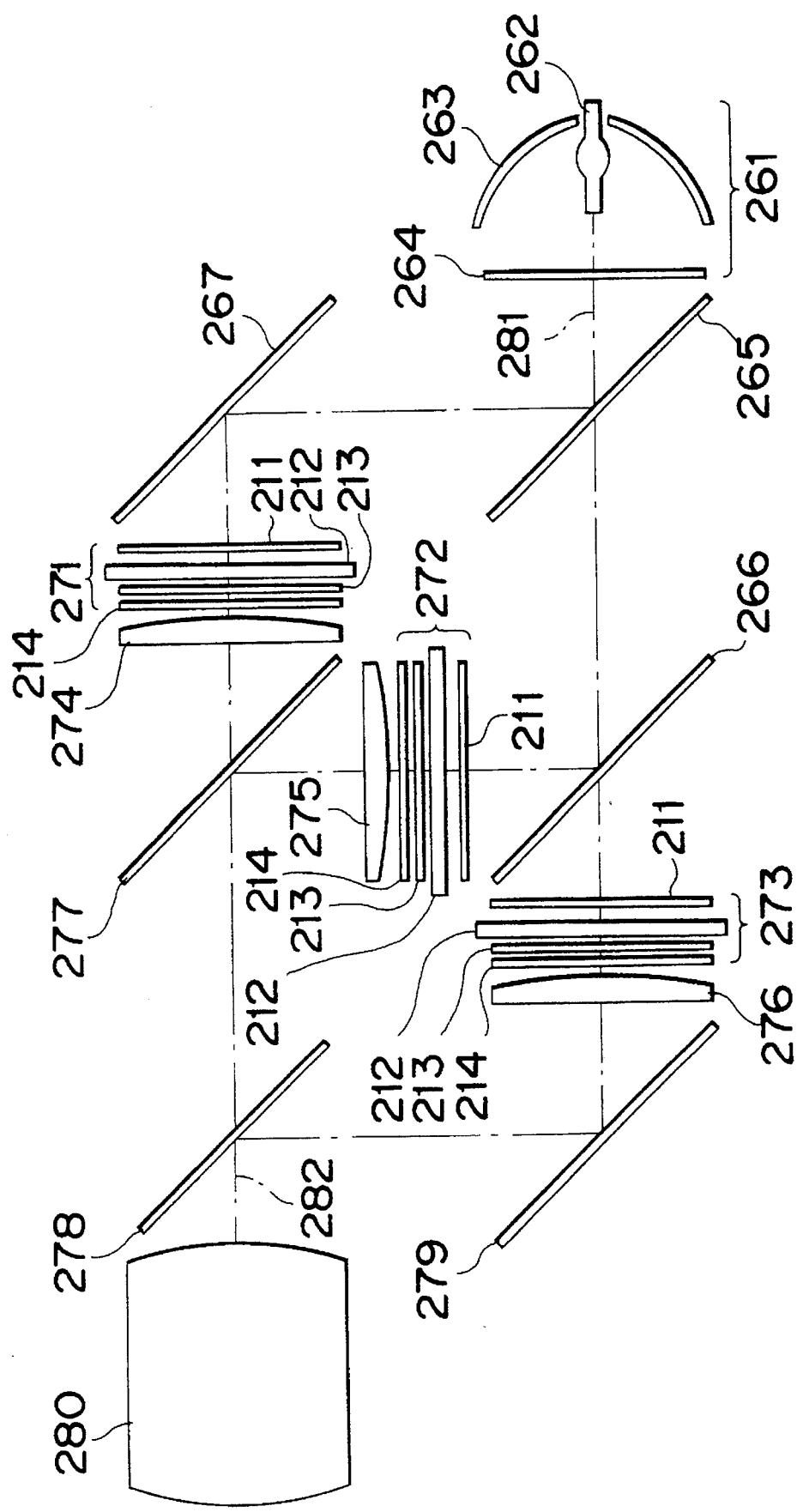
FIG. 16 is an explanatory diagram used to explain the light valve used in the projection display system according to the present invention.

FIG. 16 illustrates a structure of a third embodiment of the projection display system of the present invention. In FIG. 16, reference numerals 271, 272 and 273 represent respective light valves, each of which is identical in structure with that shown in FIG. 11. To obtain a color projected image, the three light valves associated with the three primary colors, red, green and blue, are employed.

A light source 261 includes a lamp 262, which may be a 250-watt metal halide lamp capable of emitting rays of light containing light components of the three primary colors, a concave mirror 263 and a filter 264. The rays of light emitted from the lamp 262 are collected and converted by the concave mirror 263 into a bundle of substantially parallel rays of light which are subsequently incident on the filter 264. The filter 264 is in the form of a glass substrate vapor-deposited with a multi-layered coating operable to reflect infrared and ultraviolet rays of light, but to pass visible rays of light therethrough and, therefore, infrared and ultraviolet light components contained in the rays of light from the concave mirror 263 are removed by the filter 264 while only visible rays of light emerge therefrom.

The rays of light from the light source 261 are separated by dichroic mirrors 265 and 266 and a planar mirror 267 into three beam components of the three primary colors, respectively, which are subsequently incident on the associated light valves 271, 272 and 273. After the beam components emerging from the associated light valves 271, 272 and 273 have passed through corresponding auxiliary lenses 274, 275 and 276, they are combined together by dichroic mirrors 277 and 278 and a planar mirror 279 into a single bundle of rays of light which subsequently enters a primary projection lens 280. The distances of travel of the light from the light source 261 to the light valves 271, 272 and 273 remain equal to each other and the lengths of respective optical paths from the light valves 271, 272 and 273 to the primary projection lens 280 remain equal to each other.

The rays of light emitted along the optical axis 281 of the light source pass through respective centers of the image display areas of the light valves 271, 272 and 273 and coincide with the optical axis 282 of the primary projection lens 280. The primary projection lens 280 when combined with one of the auxiliary lenses 274, 275 and 276 functions as two projection lenses. The projection lens has an aperture ratio of F4.0. Each of the auxiliary lenses 274, 275 and 276 is a lens used to render it to be telecentric on the side of the associated light valve. The light valves 271, 272 and 273 produce respective optical images as a variation of the transmissivity in dependence on a video signal, which images are combined together by the dichroic mirrors 277 and 278 and the planar mirror 279 to provide a color image which is then projected by the primary projection lens 280 onto a screen on an enlarged scale.

It has been found that, in the projection display system of the structure shown in FIG. 16, when an image was projected onto the screen having a diagonal length of 100 inches and a center gain of 1.6, the luminance at the center of the image was 10 ft-L, the contrast at the center of the image was 260:1, and the contrast at top and bottom edges of the image was 210:1. Where no phase difference plate is employed in the structure shown in FIG. 16, measurement of the contrast has indicated 150:1 at the center of the image, 130:1 at the top of the image and 100:1 at the bottom of the image. From the foregoing, it could be confirmed that the use of the phase difference plate is effective to considerably increase the contrast.

Figure 17:
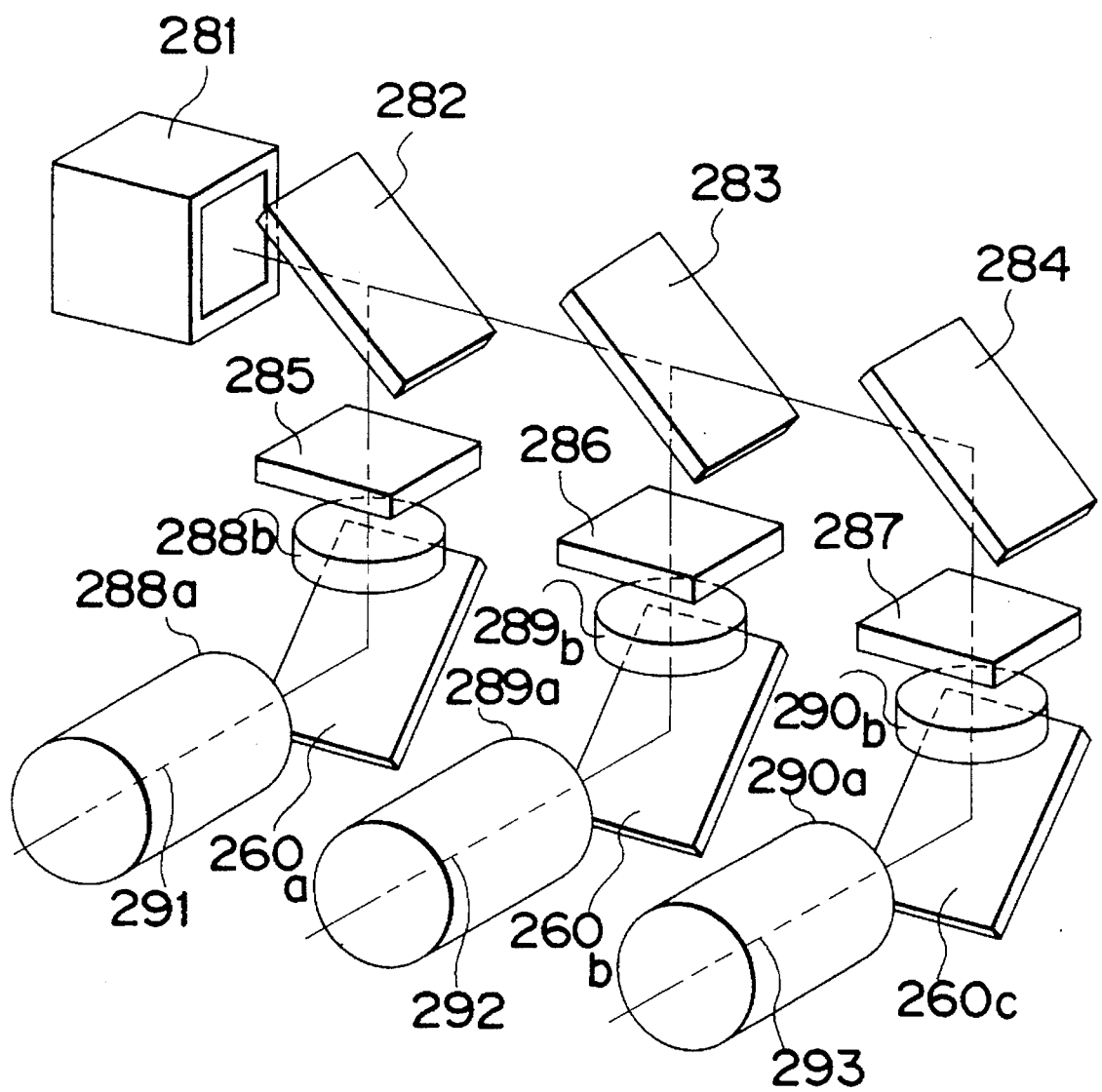
FIG. 17 is a perspective view showing the structure of the projection display system according to a different embodiment of the present invention.
Figure 18:
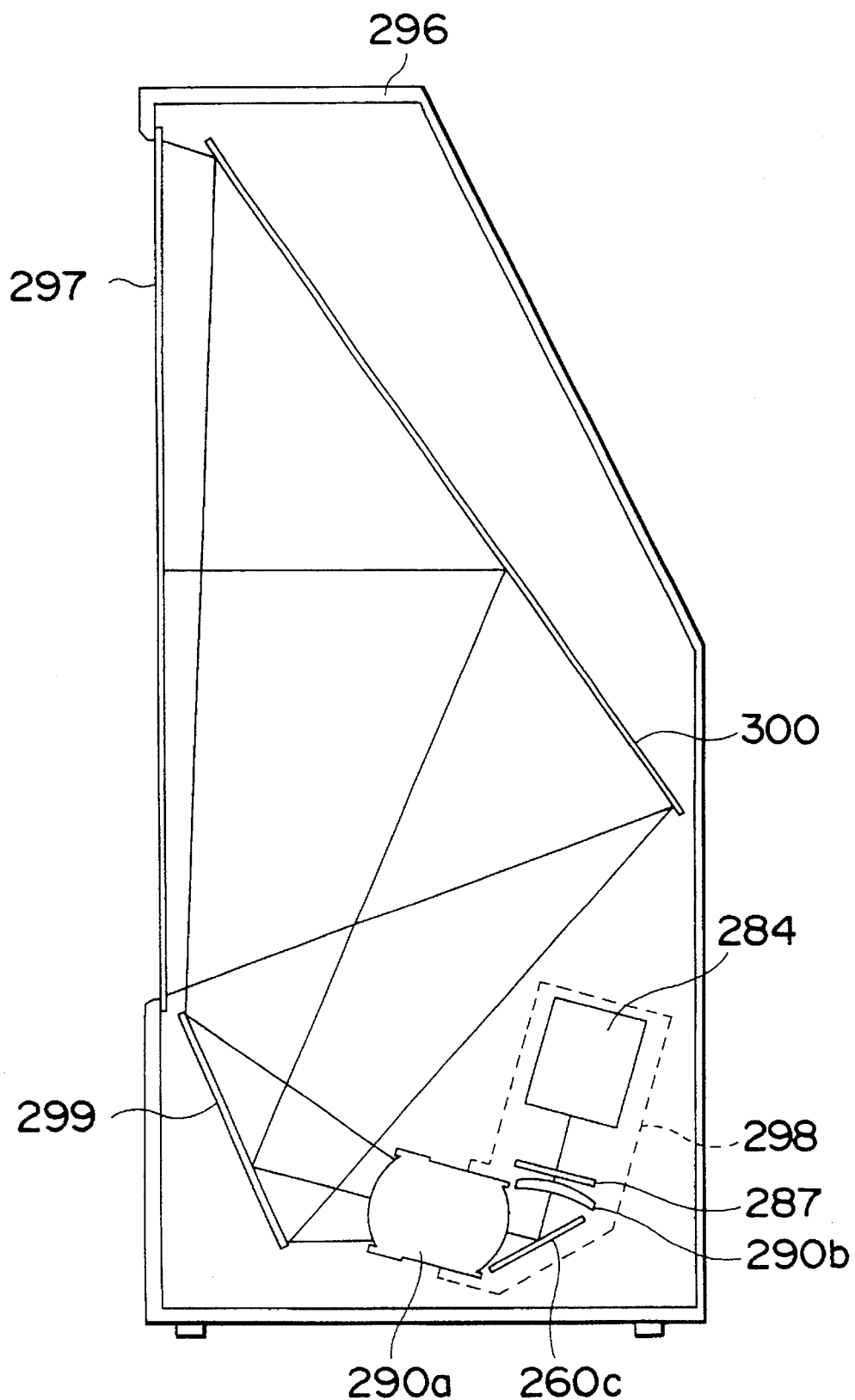
FIG. 18 is a side sectional view showing the projection display system according to a further embodiment of the present invention.

FIGS. 17 and 18 illustrate a fourth embodiment of the projection display system according to the present invention, wherein reference numeral 281 represents a light source; reference numerals 282 and 283 represent dichroic mirrors; reference numeral 284 represents a planar mirror; reference numerals 285, 286 and 287 represent light valves; reference numerals 288, 289 and 290 represent projection lenses; reference numeral 296 represents a cabinet; reference numeral 297 represents a screen; and reference numeral 298 represents a projector. Each of the light valves 285, 286 and 287 shown therein is of a structure identical with that shown in FIG. 11.

The rays of light from the light source 281 enter a color separating optical system including by the dichroic mirrors 282 and 283 and the planar mirror 284 which separate them into three beam components of the three primary colors, respectively, and the beam components of the three primary colors are subsequently incident on the associated light valves 285, 286 and 287. Thereafter the beam components emerging from the associated light valves 285, 286 and 287 enter the associated projection lenses 288, 289 and 290. The light valves 285, 286 and 287 produce respective optical images as a variation of the transmissivity in dependence on a video signal. The optical images reproduced on the associated light valves 285, 286 and 287 are then projected through the corresponding projection lenses 288, 289 and 290 onto the screen 297 on an enlarged scale. It is to be noted that reference numerals 260*a*, 260*b* and 260*c* represent mirrors. In order for the projected images of the three primary colors to be superimposed on the screen 297, the projection lenses 288, 289 and 290 have their optical axes 291, 292 and 293 oriented parallel to each other while respective centers of the image display areas of the light valves 285 and 287 positioned on respective sides of the light valve 286 are slightly displaced from the optical axes 291 and 293 of the projection lenses 288 and 290.

The internal structure of the cabinet of the projection display system utilizing the projector shown in FIG. 17 is shown in FIG. 18. The transmissive screen 297 is mounted at a front upper portion of the cabinet 296, the projector 298 is disposed within and at a rear bottom portion of the cabinet 296, the planar mirror 299 is disposed within and at a front bottom portion of the cabinet 296, and the planar mirror 300 is disposed rearwardly of the screen 297 within the cabinet 296. The distance of projection (the length of an optical path from the projection lens to the center of the screen) is shortened while the projector 298 is made compact, thereby enabling the cabinet 296 to be made compact.

Figure 7:
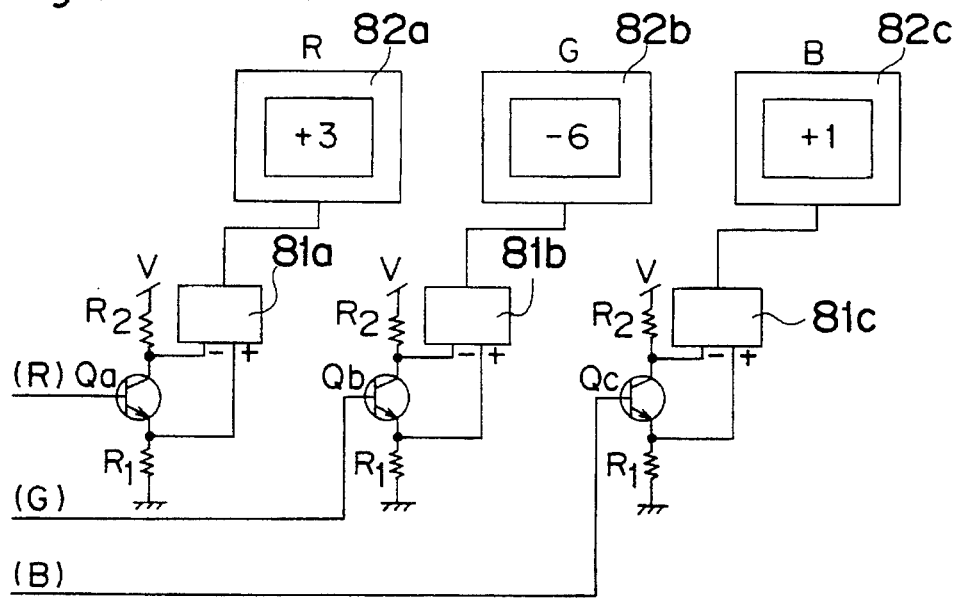
FIG. 7 is a block circuit diagram used to explain the circuit of the liquid crystal display device of the present invention.

A drive circuit for and a method of driving the projection display system of the type employing the three light valves for modulating the red, green and blue light components, such as shown in FIG. 16 and FIG. 17 will now be described. FIG. 7 illustrates an explanatory diagram used to illustrate a drive circuit in one embodiment of the projection display system. In FIG. 7, reference numeral 82*a* represents the liquid crystal display device for modulating the red light, reference numeral 82*b* represents the liquid crystal display device for modulating the green light, and reference numeral 82*c* represents the liquid crystal display device for modulating the blue light. Resistors $R_1$ and $R_2$ and a transistor Q form a phase divider circuit by which video signals of positive and negative polarities are formed in response to the video signal inputted to the base, which divider circuit corresponds to what is shown by 72 in FIG. 6. Reference numeral 81 represents an output switching circuit for outputting to the liquid crystal display device an alternating current video signal having its polarity reversed for each field. The video signal is, after having its gain adjusted to a predetermined value, divided into signal components associated with the red, green and blue light. These video signal components are hereinafter referred to as R, G and B video signals, respectively.

The R, G and B video signals are supplied to the associated phase divider circuits each operable to form two video signals of positive and negative polarities. These two video signals are inputted to the associated output switching circuit 81*a*, 81*b* and 81*c* from which the video signals having their polarities reversed for each field are subsequently outputted. Reversion of the polarity for each field in the manner described above is for the purpose of ensuring an application of an alternating voltage to the liquid crystal material thereby to avoid a degradation of the liquid crystal material. Thereafter, the video signals emerging from each of the associated output switching circuits 81*a*, 81*b* and 81*c* are inputted to the source drive IC 74 shown in FIG. 6. The drive control circuit 76 causes the liquid crystal display device 82 to effect an image display in synchronism with the source drive IC 74 and the gate drive IC 75.

Hereinafter, the sensitivity of the human eyes will be discussed. The human eyes exhibits the maximum sensitivity at a wavelength of about 550 nm. Of the three primary colors of light, the eye is most sensitive to green and then to red, but is most dull to blue. In order to obtain a luminance signal proportional to this sensitivity, 30% red, 60% green and 10% blue have to be added. Accordingly, in order to obtain a white display in a televised picture, a color mixing has to be made at a ratio of R:B:G=3:6:1. Also, as discussed hereinbefore, the liquid crystal requires an alternating current drive. This alternating current drive is achieved by applying alternately signals of positive and negative polarities relative to the voltage (hereinafter referred to as a common voltage) to be applied to the counterelectrode of the liquid crystal panel. In the illustrated embodiment, the condition in which light of an intensity corresponding to the eye's sensitivity n is modulated while the signal of a positive polarity is applied and the condition in which light of an intensity corresponding to the eye's sensitivity n while the signal of a negative polarity is applied are denoted by +n and −n, respectively.

By way of example, it is expressed by +3.−6.+1 if the liquid crystal panel is illuminated by the light having a ratio of R:G:B=3:6:1, the signals of positive polarity are applied to the liquid crystal panels associated with the red and blue colors and the signal of negative polarity is applied to the liquid crystal panel associated with the green color. It is to be noted that the color mixing ratio of R:G:B=3:6:1 applied to the case with the picture televised according to the NTSC scheme and may differ therefrom in the case of the projection display system depending on the characteristic of the lamp forming the light source and those of the dichroic mirrors. In the case shown in FIG. 7, as indicated by +3.−6.+1, the light of R:G:B=3:6:1 is radiated and the signals of positive polarity are applied to the liquid crystal panels associated with the red and blue colors while the signal of negative polarity is applied to the liquid crystal panel associated with the green color. After one field period, they assume respective conditions in which signals expressing −3.+6.−1 are applied.

Waveforms of the signals applied to the three liquid crystal panels are shown in FIG. 8. FIG. 8(*a*) shows a waveform of the signal applied to the liquid crystal display device 82*a* used to modulate the red light component; FIG. 8(*b*) shows a waveform of the signal applied to the liquid crystal display device 82*b* used to modulate the green light component; and FIG. 8(*c*) shows a waveform of the signal applied to the liquid crystal display device 82*c* used to modulate the blue light component. As the waveforms shown in FIGS. 8(*a*) to 8(*c*) make it clear, the signal associated with the modulation of the green light component is made to have a polarity opposite to that of any one of the signals associated with the modulation of the red and blue light components. In general in the liquid crystal display devices, even though the same signals are applied, a difference may occur between voltages retained by the pixels during an even-numbered field and during an odd-numbered field, respectively, because the ON and OFF currents of the thin-film transistors vary with the polarity of the video signal or because a difference occur in retentivity between a positive electric field of the orientation film and a negative electric field of the orientation film. Because of this difference, a phenomenon know as flicker occurs.

However, in the projection display system of the present invention, the polarity of each of the signals applied to the neighboring source signal lines is varied as shown in FIG. 9 while the signal associated with the modulation of the green light component is rendered to have a polarity opposite to that of any one of the signals associated with the modulation of the red and blue light components as shown in FIG. 8, and, therefore, a visual perception of the flicker can be avoided. It is to be noted that the reason for the use of the signal, associated with the modulation of the green light component, having a polarity opposite to that of any one of the other signals is because the intensity of light is such that R:G:B=3:6:1 which will, when the human visual perception is taken into consideration, correspond to (R+B):G= (+1):6= 4:6, and hence, it may substantially conform to 4:6.

It is to be noted that, although in any one of the foregoing embodiments of the present invention the use has been made of the transmissive liquid crystal panel, the present invention may not be limited thereto and the use may be made of a reflective liquid crystal panel and in such case the pixel electrodes 11 may be made of metallic material.

It is also to be noted that the structure of the liquid crystal display device is not limited to the use of the thin-film transistors and may employ, as the switching elements, two-terminal elements such as diodes.

As hereinbefore discussed, in the liquid crystal display device of the present invention, by forming the pixel electrodes and the source signal lines so as to overlap with each other and, with due consideration paid to the driving method, the light leak tending to occur at the perimeter of the pixel due to the video signal applied to the source signal lines can be reduced considerably. Accordingly, both of the display contrast and the image quality can be considerably increased. In the case of the projection display system utilizing the liquid crystal display device, the contrast brings about a considerable influence on an improvement of the image quality and, accordingly, the use of the liquid crystal display device of the present invention in the projection display system is effective to improve the image quality considerably.

Also, in order to prevent the reverse-tilt domain from occurring and also to avoid the light leak, the parallel rubbing is recommended. In such case, the image quality of the projected image will not exhibit a symmetric characteristic with respect to the left-to-right direction, but in the diagonal direction. However, with the present invention, the use of the phase difference plate makes it possible to render the optimum incident angle to be 0° as shown by the solid line in FIG. 12 and, therefore, if the projection lens is telecentric, the projected image of high contrast having an uniform image quality can be obtained. Nevertheless, the occurrence of the reverse-tilt domain is reduced considerably and, therefore, the aperture of each pixel increases thereby to accomplish an image display at a high luminance.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A liquid crystal display device which comprises:

a first substrate including:

a first signal line for transmitting a video signal therethrough, a second signal line disposed adjacent to the first signal line for transmitting the video signal therethrough, a pixel electrode having a light transmissive property and overlaying the first and second signal lines through an insulating thin film;

first and second thin-film transistor elements, a third signal line for transmitting therethrough a first switching signal necessary to selectively switch the first transistor element on and off, and a fourth signal line disposed adjacent the third signal for transmitting therethrough a second switching signal necessary to selectively switch the second transistor element on and off;

a second substrate formed with a counterelectrode;

a layer of liquid crystal material sandwiched between the first and second substrates; and a first drive circuit for applying to the second signal line a signal of a polarity opposite to that of the video signal supplied to the first signal line;

a second drive circuit for applying the first switching signal to the third signal line;

a phase dividing means for outputting a video signal of a positive polarity and a video signal of a negative polarity; and an output switching circuit adapted to receive the video signals and operable to output to the first drive circuit the video signal of the positive polarity and the video signal of the negative polarity alternately for a predetermined cycle;

said first transistor element having a first terminal connected with the first signal line, a second terminal connected with the pixel electrode and a third terminal connected with the third signal line;

said second transistor element having a first terminal connected with the second signal line, a second terminal connected with the pixel electrode and a third terminal connected with the fourth signal line;

said pixel electrode being capacitance-coupled with the first signal line and also with the second signal line; and said second drive circuit being operable to apply the first and second switching signals to the third and fourth signal lines, respectively, such that the first and second transistor elements will not be switched on simultaneously.

2. The liquid crystal display device as claimed in claim 1, wherein when both of said first and second transistor elements are switched off, a parasitic capacitance between the pixel electrode and the first signal line is substantially equal to that between the pixel electrode and the second signal line.

3. A liquid crystal projection television set which comprises:

a light generating means;

a color separating means for separating rays of light emitted by the light emitting means into red, green and blue optical paths;

a liquid crystal display device disposed on each of the optical paths and comprising a first substrate including a first signal line for transmitting a video signal therethrough, a second signal line disposed adjacent to the first signal line for transmitting the video signal therethrough, a thin-film transistor element, a third signal line for transmitting a switching signal necessary to selectively switch the transistor element on and off, and a pixel electrode overlaying the first and second signal lines through an insulating thin film, said pixel electrode being capacitance-coupled with said first signal line and also with said second signal line; a second substrate formed with a counterelectrode; a layer of liquid crystal material sandwiched between the first and second substrates; and a drive circuit for applying to the second signal line a signal of a polarity opposite to that of the video signal supplied to the first signal line, said transistor element having a first terminal connected with the first signal line, a second terminal connected with the pixel electrode and a third terminal connected with the third signal line;

a projecting means for projecting rays of light modulated by the liquid crystal display device, wherein a polarity of a signal to be applied to the liquid crystal display device for modulating green rays of light being opposite to that of a signal to be applied to any one of liquid crystal display devices for modulating red and blue rays of light, respectively.

4. A liquid crystal projection television set which comprises:

a) light emitting means;

b) a liquid crystal display device comprising;
- a first substrate including:
  - a first signal line for transmitting a video signal therethrough,
  - a second signal line disposed adjacent to the first signal line for transmitting the video signal therethrough,
  - a pixel electrode having a light transmissive property and overlaying the first and second signal lines through an insulating thin film;
  - first and second thin-film transistor elements,
  - a third signal line for transmitting therethrough a first switching signal necessary to selectively switch the first transistor element on and off, and
  - a fourth signal line disposed adjacent the third signal for transmitting therethrough a second switching signal necessary to selectively switch the second transistor element on and off;
- a second substrate formed with a counterelectrode;
- a layer of liquid crystal material sandwiched between the first and second substrates; and
- a first drive circuit for applying to the second signal line a signal of a polarity opposite to that of the video signal supplied to the first signal line;
- a second drive circuit for applying the first switching signal to the third signal line;
- a phase dividing means for outputting a video signal of a positive polarity and a video signal of a negative polarity; and
- an output switching circuit adapted to receive the video signals and operable to output to the first drive circuit the video signal of the positive polarity and the video signal of the negative polarity alternately for a predetermined cycle;
- said first transistor element having a first terminal connected with the first signal line, a second terminal connected with the pixel electrode and a third terminal connected with the third signal line;
- said second transistor element having a first terminal connected with the second signal line, a second terminal connected with the pixel electrode and a third terminal connected with tile fourth signal line;
- said pixel electrode being capacitance-coupled with the first signal line and also with the second signal line; and
- said second drive circuit being operable to apply the first and second switching signals to the third and fourth signal lines, respectively, such that the first and second transistor elements will not be switched on simultaneously;

c) optical means for guiding rays of light from said light emitting means to said liquid crystal display device; and d) projection means for projecting the rays of light which have been modulated by said liquid crystal display device.

* * * * *

UNITED STATES PATENT AND TRADEMARK OFFICE
CERTIFICATE OF CORRECTION

PATENT NO.    : 5,453,857
DATED         : September 26, 1995
INVENTOR(S)   : Takahara It is certified that error appears in the above-identified patent and that said Letters Patent is hereby corrected as shown below:

```
Column 20, line 21, delete "tile" insert --the--.
```

Signed and Sealed this

Nineteenth Day of March, 1996

Attest:

BRUCE LEHMAN

*Attesting Officer*　　　*Commissioner of Patents and Trademarks*